US011265919B2

United States Patent
Roy et al.

(10) Patent No.: US 11,265,919 B2
(45) Date of Patent: Mar. 1, 2022

(54) RACH PROCEDURES IN UNLICENSED SPECTRUM

(71) Applicant: IDAC Holdings, Inc., Wilmington, DE (US)

(72) Inventors: Arnab Roy, Phoenixville, PA (US); Janet A. Stern-Berkowitz, Little Neck, NY (US); J. Patrick Tooher, Montreal (CA); Alpaslan Demir, East Meadow, NY (US); Moon-il Lee, Melville, NY (US); Muhammad U. Fazili, Audubon, PA (US); Kevin T. Wanuga, Souderton, PA (US); Sanjay Goyal, Deer Park, NY (US); Mihaela Beluri, Jericho, NY (US); Scott M. Newton, Commack, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 26 days.

(21) Appl. No.: 16/621,426

(22) PCT Filed: Jun. 14, 2018

(86) PCT No.: PCT/US2018/037546
§ 371 (c)(1),
(2) Date: Dec. 11, 2019

(87) PCT Pub. No.: WO2018/232123
PCT Pub. Date: Dec. 20, 2018

(65) Prior Publication Data
US 2020/0107373 A1 Apr. 2, 2020

Related U.S. Application Data

(60) Provisional application No. 62/590,875, filed on Nov. 27, 2017, provisional application No. 62/519,535, filed on Jun. 14, 2017.

(51) Int. Cl.
H04J 1/16 (2006.01)
H04J 3/14 (2006.01)
(Continued)

(52) U.S. Cl.
CPC ....... H04W 74/0833 (2013.01); H04L 5/0048 (2013.01); H04L 43/18 (2013.01); H04W 24/08 (2013.01); H04W 4/70 (2018.02)

(58) Field of Classification Search
CPC ............. H04W 74/0833; H04W 24/08; H04W 4/70; H04L 5/0048; H04L 43/18
(Continued)

(56) References Cited

U.S. PATENT DOCUMENTS

2016/0219622 A1* 7/2016 Liu ........................ H04W 76/10
2019/0104550 A1* 4/2019 Yang .................... H04L 25/0226
2019/0215864 A1* 7/2019 Yang ..................... H04W 80/02

FOREIGN PATENT DOCUMENTS

| EP | 3297386 A1 | 3/2018 |
| WO | 2016/163746 A1 | 10/2016 |
| WO | 2016/182385 A1 | 11/2016 |

OTHER PUBLICATIONS

3rd Generation Partnership Project (3GPP), TS 36.212 V14.0.0, "Technical Specification Group Radio Access Network, Evolved Universal Terrestrial Radio Access (E-UTRA), Multiplexing and Channel Coding (Release 14)", Sep. 2016, pp. 1-148.
(Continued)

*Primary Examiner* — Maharishi V Khirodhar
(74) *Attorney, Agent, or Firm* — Condo Roccia Koptiw LLP

(57) ABSTRACT

Systems, methods, and instrumentalities are disclosed for Random Access Channel (RACH) procedures in unlicensed spectrum. A wireless transmit/receive unit (WTRU) may monitor for a random access response (RAR) or a reference
(Continued)

signal (RS), e.g. in an RAR window. The WTRU may determine whether an RS has been received a threshold amount of times, e.g. if an RAR is not received. The WTRU may continue to monitor for an RAR or an RS, e.g. if the RS has not been received a threshold amount of times and the RAR window is not at a maximum RAR window size.

14 Claims, 16 Drawing Sheets

(51) Int. Cl.
| | | |
|---|---|---|
| | *H04L 1/00* | (2006.01) |
| | *H04W 74/08* | (2009.01) |
| | *H04W 24/08* | (2009.01) |
| | *H04L 43/18* | (2022.01) |
| | *H04L 5/00* | (2006.01) |
| | *H04W 4/70* | (2018.01) |

(58) Field of Classification Search
USPC .......................................................... 370/252
See application file for complete search history.

(56) References Cited

OTHER PUBLICATIONS

3rd Generation Partnership Project (3GPP), TS 36.213 V14.2.0, "Technical Specification Group Radio Access Network, Evolved Universal Terrestrial Radio Access (E-UTRA), Physical Layer Procedures (Release 14)", Mar. 2017, 455 pages.

* cited by examiner

RACH PROCEDURES IN UNLICENSED SPECTRUM

CROSS-REFERENCE TO RELATED APPLICATIONS

This application is the National Stage entry under 35 U.S.C. § 371 of Patent Cooperation Treaty Application PCT/US2018/037546, filed Jun. 14, 2018, which claims the benefit of U.S. Provisional Application No. 62/519,535, filed Jun. 14, 2017 and U.S. Provisional Application No. 62/590,875, filed Nov. 27, 2017, the contents of which are incorporated by reference herein.

BACKGROUND

Mobile communications continue to evolve. A fifth generation may be referred to as 5G. A previous (legacy) generation of mobile communication may be, for example, fourth generation (4G) long term evolution (LTE). Mobile wireless communications implement a variety of radio access technologies (RATs), such as New Radio (NR). Use cases for NR may include, for example, extreme Mobile Broadband (eMBB), Ultra High Reliability and Low Latency Communications (URLLC) and massive Machine Type Communications (mMTC).

Wireless communications may support applications with varying requirements. For example, some applications may require low latency, while other applications may be delay tolerant. Some applications may require high reliability, while high reliability may be less critical for other applications. Applications may include, for example, Enhanced mobile broadband (eMBB), machine-type communications (MTC), massive MTC (mMTC), and Ultra-reliable-and-low-latency communications (URLLC). Applications may be useful in a wide range of industries, such as automotive, health, agriculture, utilities and logistics industries.

Wireless communications may be deployed using licensed spectrum and/or unlicensed spectrum. Unlicensed spectrum may be used, for example, for non-cellular services and applications such as Wi-Fi and/or cellular service (e.g. broadband data service). Unlicensed spectrum may be shared by multiple users that may interfere with each other, which may pose constraints on the use of unlicensed spectrum.

SUMMARY

Systems, methods, and instrumentalities are disclosed for Random Access Channel (RACH) procedures in unlicensed spectrum. A wireless transmit/receive unit (WTRU) may monitor for a random access response (RAR) or a reference signal (RS), e.g. in an RAR window. The WTRU may determine whether an RS has been received a threshold amount of times, e.g. if an RAR is not received. The WTRU may continue to monitor for an RAR or an RS, e.g. if the RS has not been received a threshold amount of times and the RAR window is not at a maximum RAR window size.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
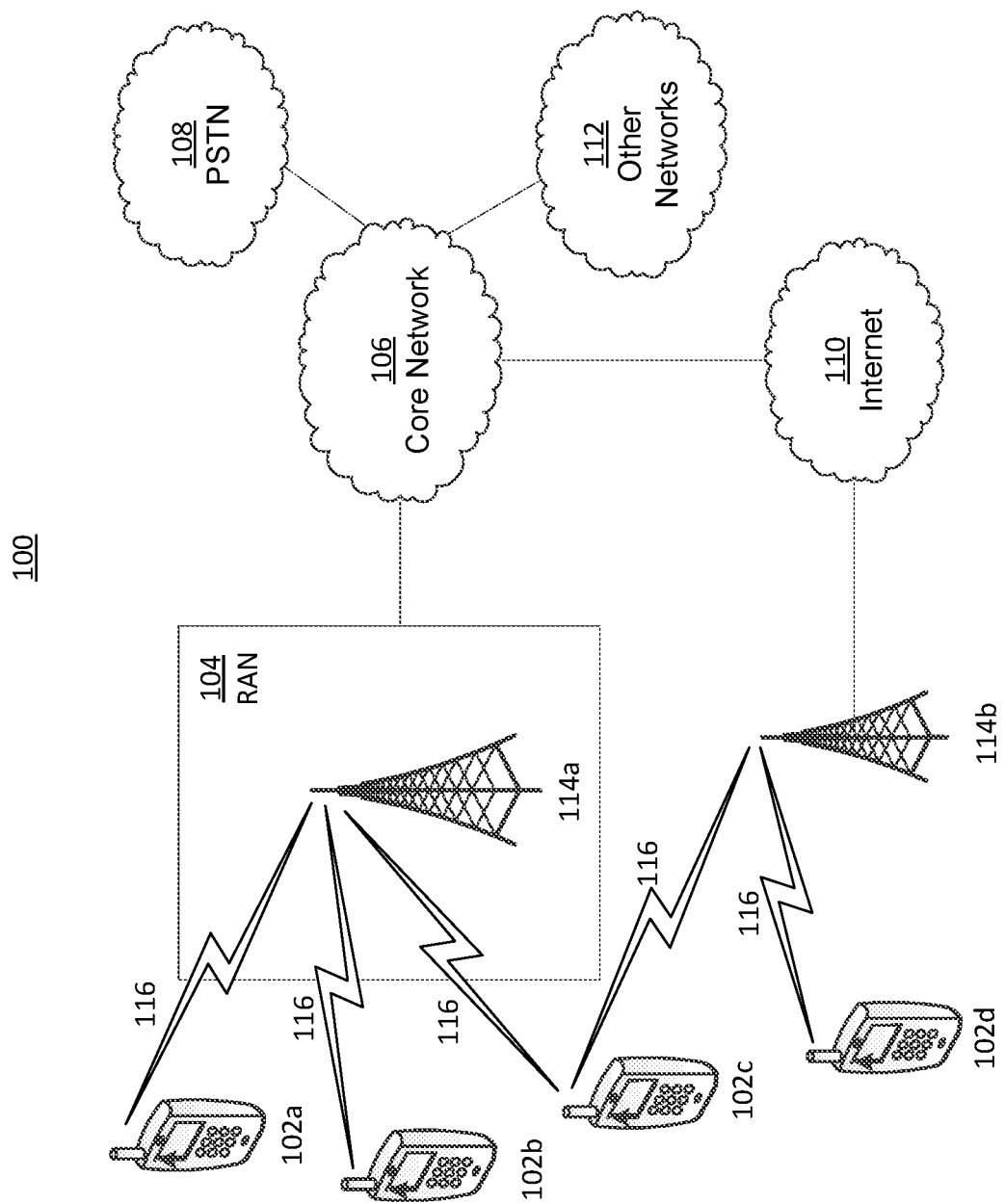
FIG. 1A is a system diagram illustrating an example communications system in which one or more examples may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum.

A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
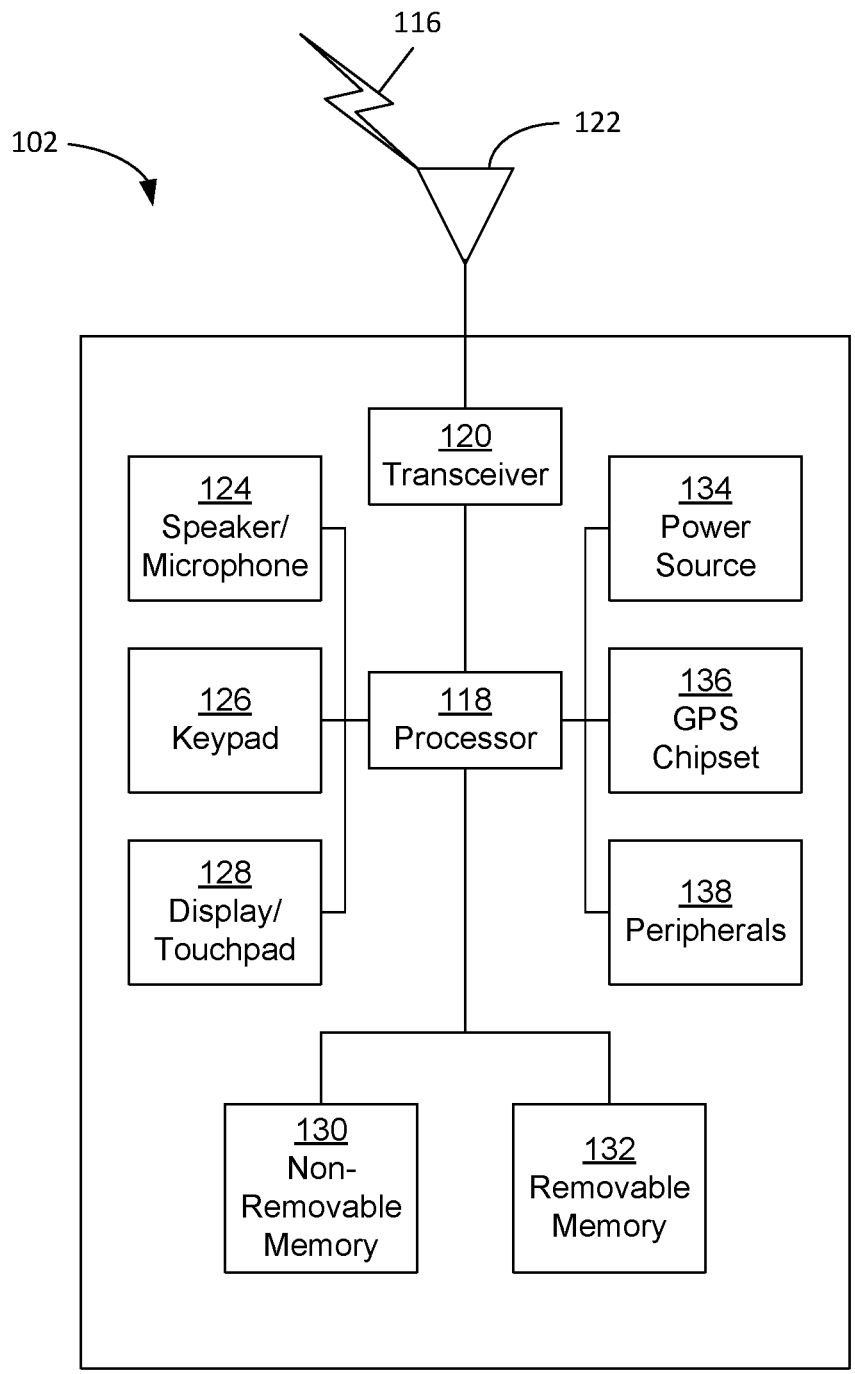
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
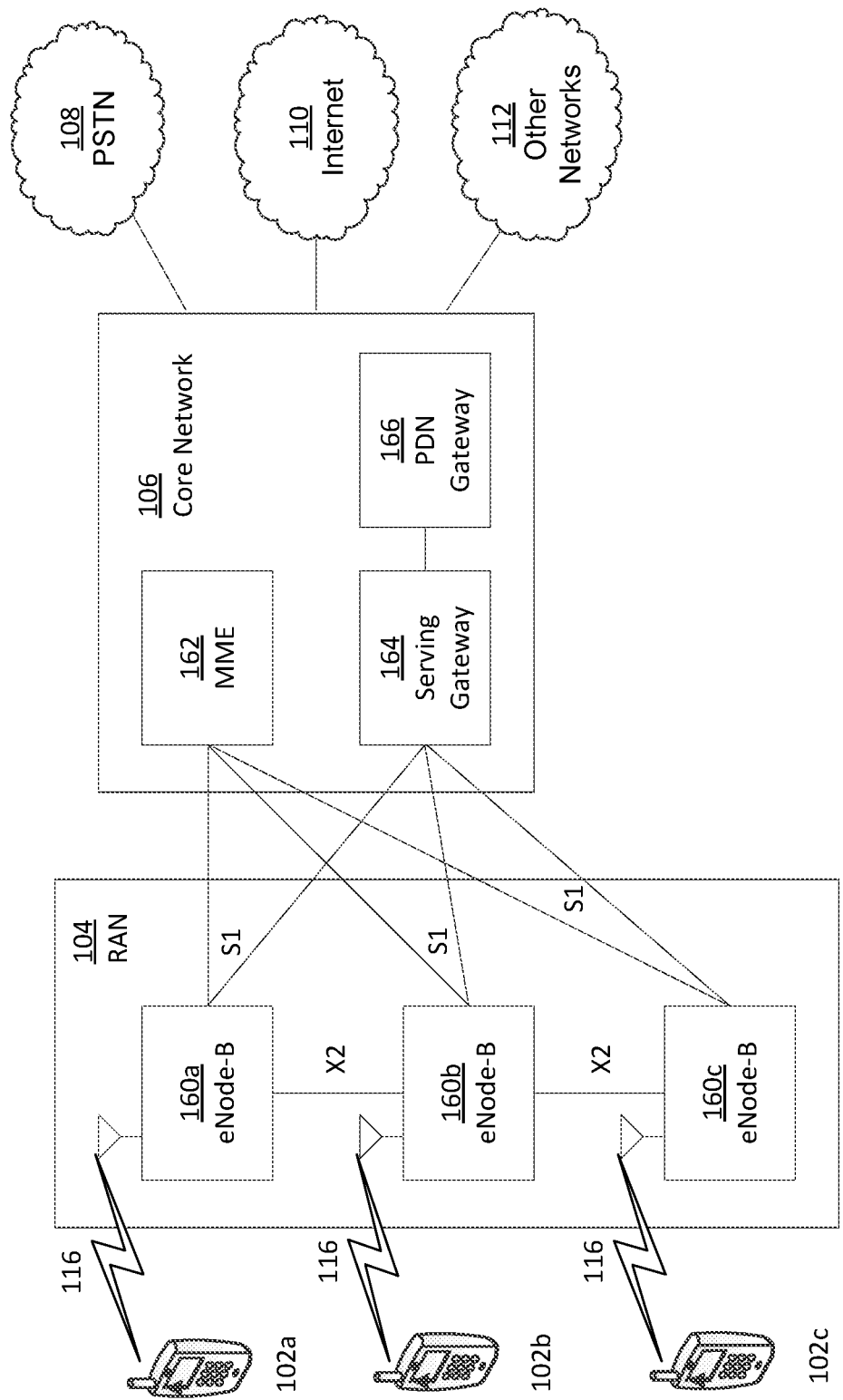
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
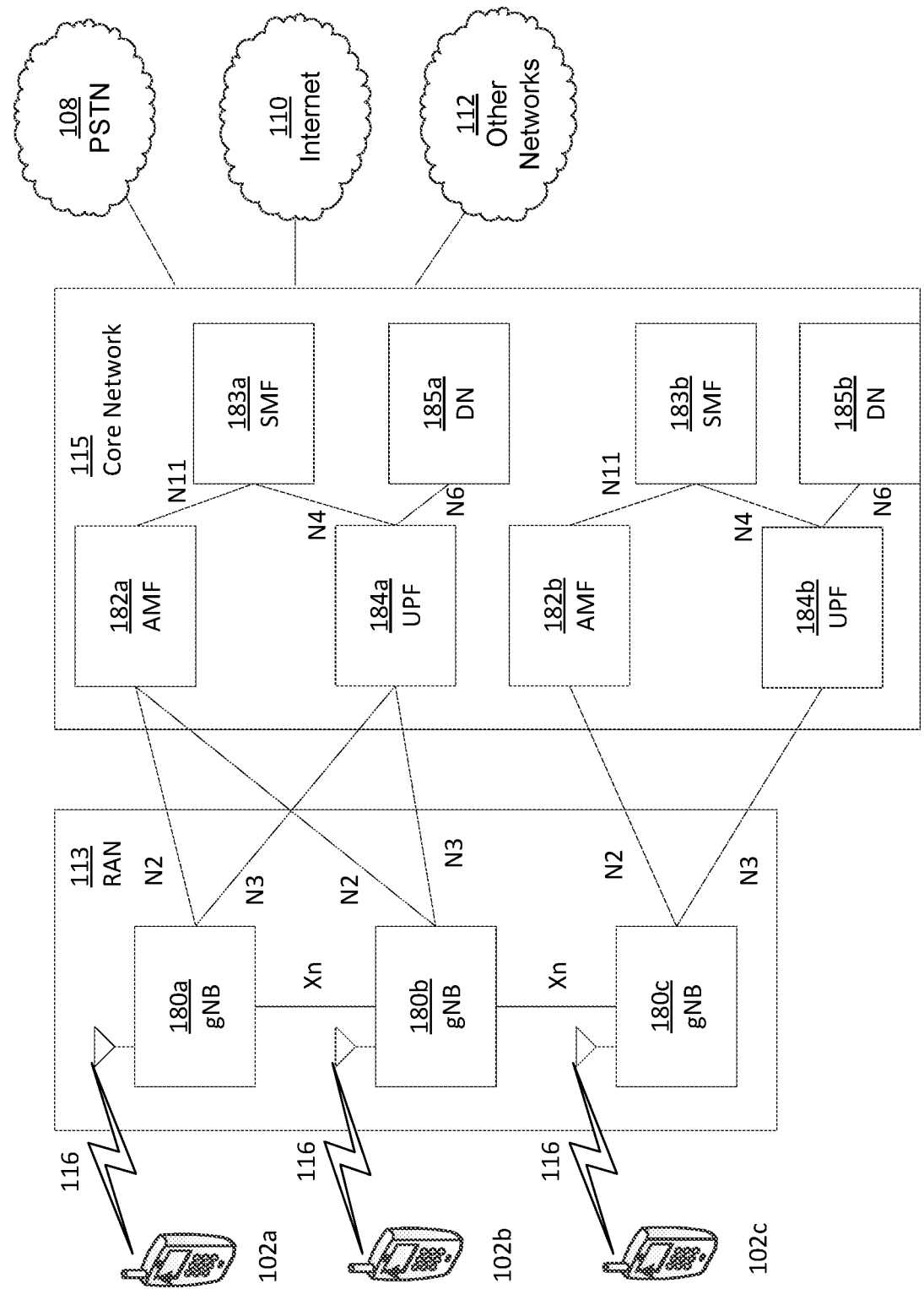
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 6:
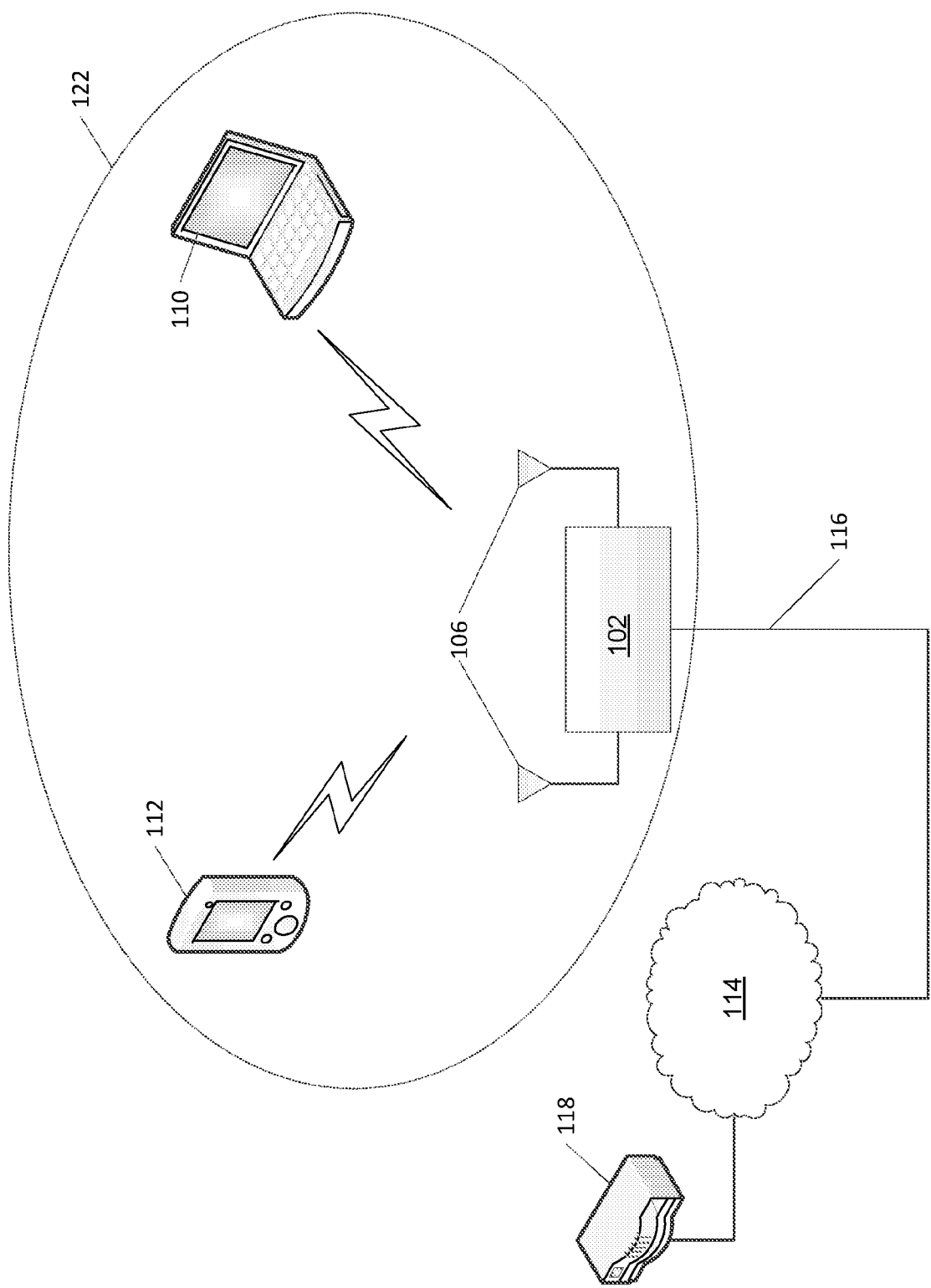
FIG. 6 illustrates examples of WLAN devices.

FIG. 6 illustrates examples of wireless local area network (WLAN) devices. One or more of the devices may be used to implement one or more of the features described herein. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 6), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 6. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processer. The processer may communicate with one or more entities of memory, e.g., via a system bus, directly, etc.

Operation or use of a cell, transmission-reception point (TRP) or carrier in an unlicensed band may be, for example, stand-alone, or may be assisted by the operation or use of a cell, TRP, or carrier in a licensed band. An assisted deployment scenario may be referred to as licensed assisted access (LAA). A licensed cell, TRP, or carrier may be a primary or anchor cell, TRP, or carrier.

Coexistence of a cellular system operation with unlicensed technologies (e.g. Wi-Fi) and cellular operators in unlicensed spectrum may be considered, for example, to minimize interference and provide for fairness among spectrum users. Mechanisms such as Listen-Before-Talk (LBT) or Clear Channel Assessment (CCA) may be used (e.g. for fair coexistence). In an example, nodes such as network side nodes or user side nodes (e.g., as described herein) may listen to a channel (e.g. a frequency band with a certain center frequency and bandwidth), for example, to determine whether another user may be using the channel, before transmitting on the channel or a portion thereof. Listening and/or determination of usage by another may, for example, include or be based on measurements (e.g. energy detection).

Listen Before Talk (LBT), Clear Channel Assessment (CCA), and LBT/CCA may be used interchangeably herein. A channel may be determined to be busy, occupied, or in use, for example, when a measurement (e.g. of energy) is at or above a threshold. A channel may be determined to be idle, free, clear, or unused, for example, when a measurement (e.g. of energy) is at or below a threshold.

"Clear," "free," "idle," "not occupied," and "not busy" may be used interchangeably. "Not clear," "not free," "not idle," "occupied," and "busy" may be used interchangeably. "Channel" and "operating channel" may be used interchangeably. A CCA failure may mean, for example, that a channel is busy. A CCA pass may mean, for example, that a channel is clear.

A potential transmitter on a channel (e.g. a WTRU with a potential UL transmission and/or an eNB with a potential DL transmission) may evaluate and/or monitor (e.g. receive) a channel (e.g. to measure and/or determine signal presence or interference on the channel) prior to transmission, for example, to determine whether the channel is in use (e.g. busy and/or occupied) by another, such as another system, user, or signal.

A potential transmitter may (e.g. as part of LBT/CCA) compare a received signal and/or interference from a channel to criteria (e.g. one or more threshold levels), for example, to determine (e.g. based on the comparison) whether the channel is free. A potential transmitter may transmit on the channel, for example, when the potential transmitter determines the channel is free. A potential transmitter may not transmit on a channel, defer a potential transmission, and/or discard the potential transmission, for example, when a potential transmitter determines the channel may not be free.

Frame Based Equipment (FBE) may refer to equipment for which transmit/receive timing may be fixed and/or structured. Load Based Equipment (LBE) may not perform LBT/CCA according to a certain frame structure, e.g., at fixed or defined times. LBE may perform LBT/CCA, for example, when the LBE has data to transmit.

Equipment may refer to a node or device (e.g. a network side node or user side node as described herein) that may transmit and/or receive on a licensed and/or unlicensed channel.

An eNB may be used to refer to or represent one or more of a gNB, TRP, STA, cell, base station (BS), and/or AP, where "eNB," "gNB," "TRP," "STA," "cell," and "AP" may be used interchangeably. An eNB, gNB, or TRP may be used, for example, to represent one or more of a gNB, TRP, STA, cell, BS, AP, and/or another node (e.g. a network node).

In an example, equipment may perform an LBT/CCA check (e.g. to detect energy on a channel), for example, before a transmission or a burst of transmissions on an operating channel.

An LBT/CCA time period for channel evaluation may be a fixed time and/or may a have a minimum time.

A Channel Occupancy Time (COT) may be a total time during which equipment may have transmissions on a given channel, e.g., without re-evaluating availability of the channel.

A Maximum COT (MCOT) may be a total time that equipment may make use of an operating channel for a given transmission or burst of transmissions.

A value of MCOT may be configured or allowed (e.g. by regulation). MCOT may be, for example, 4 ms or 10 ms.

MCOT for equipment may be less than a maximum allowed value, which may, for example, be set by a manufacturer of the equipment.

An idle period may be a time (e.g. a consecutive period of time) during which equipment may not transmit on a channel.

An Idle Period may have a minimum requirement (e.g. with respect to a COT, such as 5% of the COT) that may be used by equipment, e.g., for a current Fixed Frame Period.

Equipment may transmit (e.g. immediately) on a clear channel or channels, for example, when the equipment finds (e.g. during or as a result of LBT/CCA) an operating channel or channels to be clear.

Equipment may not transmit in a channel, for example, when the equipment finds (e.g. during or as a result of LBT/CCA) an operating channel occupied. Equipment may perform a subsequent LBT/CCA, which may find the channel clear.

Equipment may not transmit on a channel (e.g. during the next Fixed Frame Period), for example, when the equipment finds (e.g. during or as a result of LBT/CCA) an operating channel occupied.

An LBT/CCA that is performed subsequent to an LBT/CCA that found a channel not clear may, for example, involve a wait or backoff time, e.g., before checking for a clear channel.

An LBT/CCA that is performed subsequent to an LBT/CCA that found a channel not clear may, for example, involve a longer period during which to determine whether the channel may be clear and to subsequently transmit.

A WTRU may perform CCA, for example, to determine whether a channel is free. A WTRU may add additional backoff or wait time, such as an additional contention window amount of time, for example, when a WTRU determines a channel is not free. A WTRU may (e.g. upon determining a channel is free) check again before actual transmission, for example, when actual transmission does not begin (e.g. immediately) after a channel is determined to be free.

In an example, a WTRU may perform CCA (e.g. for at least a check-window amount of time prior to actual transmission), for example, when the WTRU is not within a check-window (e.g. 25 us) prior to actual transmission. A WTRU may (e.g. only) transmit, for example, when a channel is determined to be free (e.g. for at least part of a check-window amount of time).

A CCA may be, for example, a full CCA or a short CCA. A full CCA may, for example, include adding one or more backoff times, e.g., when a channel is determined to be busy. A short CCA may be a quick check (e.g. an energy detection check), for example, in a check-window prior to the start of transmission or intended or planned transmission.

A WTRU may perform a full CCA (e.g. to determine whether a channel is free), for example, when a WTRU performs a CCA for a first subframe (SF) or symbol. A WTRU may perform a short CCA, for example, prior to a transmission (e.g. to re-check that a channel remains free), for example, when there is a gap between the end of a full CCA and the start of the transmission.

A WTRU may (e.g. in some scenarios such as LTE LAA UL) perform a CCA for a transmission beginning, for example, on a starting boundary of a time period or on a boundary of a time unit that may be within a time period.

A time period may comprise, for example, a subframe (SF), a set of subframes, a frame, a set of frames, a slot, a mini-slot, a set of slots or mini-slots, a TTI, a short TTI, a multi-symbol TTI, a set of TTIs, a symbol, a set of symbols, a sync burst, a sync block, a set of sync bursts or sync blocks, and the like. A time period may comprise one or more time units. A time unit (e.g. within a time period) may comprise, for example, a symbol, a slot, a mini-slot, a TTI, a short TTI, a multi-symbol TTI, a set of symbols, a sync burst, a sync block, an SF, and the like. A time unit and a time period may be used interchangeably in one or more examples.

In an example, a WTRU may perform a CCA for a transmission beginning, for example, on an SF boundary or on an indicated symbol boundary within an SF. A WTRU may receive a grant for an (e.g. one) SF (e.g. a full or partial SF) or for a set of consecutive subframes. A WTRU may perform a CCA, for example, before transmission on a granted SF. In an example, a set of SFs may be granted. A WTRU may perform a CCA for a next (or a later) granted SF, for example, when the WTRU determines that a CCA failed (e.g. a channel is busy or not idle). A WTRU may transmit on an SF and remaining SFs in a granted set, for example, when the WTRU determines a channel is free for an SF in the granted SF set. Transmission may occur without performing CCA for subsequent SFs, for example, when transmission is continuous. A WTRU may perform a CCA for a transmission on an SF in a set after a break, for example, when there is a break in the transmission.

Access, use of resources, or transmission on resources on a channel, in a cell, to a cell, to a TRP or other node may be, for example, grant-based, allocation-based, or scheduler-based.

In an example, a WTRU may (e.g. only) transmit on a set of resources in response to or according to a received grant or allocation of resources. Resources may be, for example, time and/or frequency resources.

A grant or allocation may be (e.g. explicitly) provided, for example in DL control information (DCI). A grant or allocation may be configured (e.g. by higher layer signaling) and may be used by a WTRU, for example, when the WTRU has data to transmit.

Access, use of resources, or transmission on resources on a channel, in a cell, to a cell, to a TRP or other node may be grant-less or grant-free. Grant-less and grant-free may be used interchangeably. Resources may be, for example, time and/or frequency resources.

A WTRU may transmit on a set of resources, for example, when the WTRU has a transmission to make. A WTRU may determine or select resources on which it may transmit, for example, from one or more configured sets of resources.

Resources may be shared and/or used by multiple WTRUs. Resources may be referred to as contention-based resources. Transmissions of multiple WTRUs may collide, for example, when WTRUs choose and/or transmit on the same resources at the same time.

Mechanisms may be included to reduce the possibility of collision. In an example, resource selection may be determined (e.g. wholly or partially) randomly. Resource selection may be a function of a WTRU-ID. Different groups of WTRUs may be configured with different sets of resources.

Mechanisms may enable a receiver of a grant-free transmission to identify a sender. In an example, a transmission may include an identifier or a partial identifier.

Systems, methods and instrumentalities are disclosed for Random Access Channel (RACH) implementations in unlicensed spectrum. Random Access Response (RAR) reception handling may include, for example, distinguishing RAR failures, RAR window adaptation or selection for RAR reception, RA-RNTI determination and resolution and RAR capacity enhancement. Clear Channel Assessment (CCA) may be implemented with window dither and/or retry delay. Physical RACH (PRACH) resources tiers with different resource opportunities may support channel acquisition/transmission.

Random Access Response (RAR) reception handling may be provided.

A WTRU may handle a failure to receive an RAR (e.g. due to a busy channel or a failure to receive a preamble).

A WTRU may determine whether an RAR was not received due to a busy channel or due to an RAR not being sent, for example, based on information that may be provided by an eNB/gNB.

A WTRU may not count a subframe (SF) in an RAR window or may adapt (e.g. extend) the window, for example, when an RAR was not transmitted.

A WTRU may count or count down an RAR window, for example, when an eNB/gNB transmitted (e.g. without receipt of) an RAR.

A WTRU may retry (e.g. with or without ramping power and/or trying another frequency channel), for example, when an RAR window time expires without observing channel acquisition by an eNB/gNB.

Random Access Radio Network Temporary Identifier (RA-RNTI) confusion may be resolved.

RA-RNTI may be based on time (e.g. SF) and frequency resource(s) used. A WTRU may check for a preamble in an RAR Physical Downlink Shared Channel (PDSCH). A significant delay until RAR transmission may lead to confusion.

Confusion may be resolved, for example, by an RA-RNTI calculation that may take into account other parameters, such as all or a portion (e.g. bits) of a System Frame Number (SFN). Different frames and/or different frequency resources may be used.

RAR capacity may be enhanced.

RA-RNTI may be used for multiple SFs and/or frequency resources, for example, by calculating RA-RNTI based on a window of frames, SFs, and/or a set of frequencies.

A set of preambles may be split among a set of frames, SFs, and/or frequencies, for example, to avoid confusion for multiple WTRUs that may use the same preamble in a different frame, SF, and/or frequency in the same window/set. A collision may occur (e.g., may only occur) for sets if WTRUs choose, within the sets, the same frame, SF, and frequencies and the same preamble.

Clear Channel Assessment (CCA) window dither and retry delay may be provided.

A dither may be used, for example, to prevent multiple WTRUs with the same timing from seeing a free channel and transmitting (e.g. simultaneously). A (e.g. each) WTRU may add a (e.g. small) dither amount to a CCA window before transmission.

A WTRU may (e.g. when an eNB sends a Timing Advance (TA) in an RAR) adjust a TA, for example, based on a dither amount, before using it.

A WTRU may fail to acquire a channel at a start of an SF. A WTRU may retry based on a retry delay (e.g. at set time locations within an SF) and may transmit (e.g. when a channel is determined to be free). A WTRU may remove a timing delay from a TA.

PRACH resource tiers may be provided. A WTRU may use a second tier of resources (e.g. with more opportunities, more channels, etc.), for example, when the WTRU does not acquire a channel using a first tier of resources (e.g. for a number of tries).

Tiers may be differentiated, for example, by an amount of time and/or frequency resources, different frequency resources, different PRACH format or coverage level, and/or a different cell (e.g. a licensed cell).

An eNB and/or a WTRU may use a random access (RA) procedure, for example for WTRU initial access, UL timing alignment, and/or other purposes.

A WTRU may transmit a preamble sequence, e.g., a physical random access channel (PRACH) preamble sequence, at a power level. A WTRU may transmit a preamble, for example, using a resource (e.g. time/frequency resource) or resources. Preamble transmission power may, for example, be based on configured parameters and/or measurements.

A WTRU may receive parameters (e.g. configured parameters) that may be provided by an eNB. Parameters may include, for example, one or more of initial preamble power, a random access response (RAR) window size, a power ramping factor, and/or a maximum number of retransmissions. PRACH resources may include, for example, preambles or sets of preambles and/or time/frequency resources that may be used for preamble transmission. PRACH resources may be provided or configured by an eNB.

Time-frequency resource(s) for transmission may, for example, be chosen (e.g. by a WTRU) from a configured or allowed set or signaled (e.g. by an eNB) to the WTRU. An eNB may respond to WTRU transmission of a preamble with an RAR, for example, when the eNB detects the preamble.

A WTRU may monitor for reception of an RAR. Monitoring for an RAR may include, for example, monitoring for an RNTI (e.g. a RA-RNTI). Monitoring for a RNTI may include, for example, monitoring for a control channel or DCI masked or scrambled (e.g. scrambled with a CRC) with the RNTI. A control channel or DCI may include an RAR or may be associated with a data channel that may carry an RAR. An RAR may indicate transmitted preamble(s) that the RAR may correspond with or may be intended for. Multiple RARs (e.g. for different transmitted preambles that may have been transmitted by different WTRUs) may be transmitted simultaneously (e.g. in the same control channel or data channel). An RAR may include, for example one or more of the following: a timing advance (TA) value, a set of resources on which to transmit (e.g. in UL), and/or a temporary connection (TC)-RNTI.

A WTRU may determine an RA-RNTI to monitor for RAR reception, for example, based on a time and/or frequency of a preamble transmission. An RA-RNTI a WTRU may monitor for may be a function of a time period (e.g. subframe) in which the WTRU transmitted (e.g. began transmission of) a preamble. In an example, RA-RNTI may be 3, for example, when a WTRU transmitted in subframe 3 of a frame. An RA-RNTI may be a function of one or more frequency resources a WTRU used for transmission of a preamble.

A WTRU may send another preamble at a later time, for example, when the WTRU does not receive an RAR (e.g. using a determined RA-RNTI) indicating the preamble transmitted by the WTRU within an RAR window. A transmission at a later time may be at a higher power. Power may be limited to a maximum power.

A WTRU may wait (e.g. again) for receipt of an RAR from an eNB. A sequence of transmitting and waiting may continue, for example, until an eNB responds with an RAR or until a maximum number of random access preamble transmissions has been reached. An eNB may transmit and a WTRU may receive an RAR in response to one or more preamble transmissions.

One or more preambles transmitted, e.g., at progressively higher transmit powers, may be detected by an eNB. An RAR may be sent by an eNB in response to at least one detected preamble.

A WTRU may transmit on indicated resources, for example, when the WTRU receives an RAR that may be intended for it. A WTRU may apply an indicated TA to its transmission (e.g. in UL).

A PRACH preamble may be considered a PRACH resource. In an example, PRACH resources may include a PRACH preamble, time, and/or frequency resources.

RA resources, RACH resources, and PRACH resources may be used interchangeably. RA, RACH, and PRACH may be used interchangeably.

Masked and scrambled may be used interchangeably. Masking a control channel or DCI with an RNTI may be, for example, the same as masking or scrambling a CRC of a control channel or DCI with the RNTI.

A WTRU may employ coverage enhancement (CE) techniques. In an example, a WTRU may use repetition, for example, to improve performance or coverage of a transmission or reception.

Repetitions of a transmission may be combined (e.g. soft combined) at a receiver, for example, to improve performance or coverage of a transmission or reception.

In an example, a transmitter may repeat a transmission N times, e.g., in N time periods or time units. A receiver may combine multiple (e.g. up to N) transmissions to (e.g. successfully) receive the transmission. Successful reception may be determined, for example, based on a CRC check.

One or more CE levels may be supported in a cell and/or by an eNB. A WTRU may determine and/or operate, for example, using a CE level. A CE level may use, correspond to, and/or be configured with a number of repetitions. A number of repetitions that may be used for a CE level may be different for different WTRUs and/or different purposes (e.g. different signals or channels). A WTRU may transmit and/or receive, for example, according to a CE level and/or a number of repetitions that may be configured (e.g. for the CE level).

Paging may be performed. A paging occasion (PO) may be a subframe, for example, where there may be a paging message transmitted.

A paging frame (PF) may be a (e.g., one) radio frame and/or may contain one or more paging occasion(s).

A paging cycle/discontinuous reception (DRX) cycle may be the number of radio frames in a cycle, for example, where a WTRU may monitor (e.g., periodically monitor) for a page. One or more cell-specific and/or WTRU-specific paging cycles may be configured.

A WTRU may monitor (e.g., periodically monitor) the PDCCH for DL assignments on the PDCCH masked with a paging RNTI (P-RNTI) in Idle Mode and/or in Connected Mode. When a DL assignment using the P-RNTI is detected, the WTRU may demodulate the assigned PDSCH resource blocks (RBs) and/or may decode the paging channel (PCH) carried on the PDSCH. A PDSCH (e.g., which carries a PCH) may be referred to as a PCH PDSCH. Paging, paging message, and/or PCH may be used interchangeably.

In Idle Mode, the paging frame (PF) and/or the subframe within the PF (e.g., the Paging Occasion (PO) that a WTRU may monitor for the Paging Channel) may be determined based on the WTRU ID (e.g., WTRU_ID) and/or parameters which may be provided by the network. The parameters may include the paging cycle (PC) length (e.g. in frames) which may be the same as a DRX cycle and another parameter (e.g., nB, where nB may represent the number of paging occasions in a cell specific DRX cycle), which may enable the determination of the number of PF per PC and/or the number of PO per PF (e.g., which may be in the cell). The WTRU ID may be the WTRU International Mobile Subscriber Identity (IMSI) mod 1024.

From the network perspective, there may be multiple PFs per paging cycle and multiple POs within a PF. For example, more than one subframe per paging cycle may carry PDCCH masked with a P-RNTI. From the WTRU perspective, a WTRU may monitor a PO per paging cycle and/or a PO may be determined based on the parameters specified herein, which may be provided to the WTRU via system information, dedicated signaling information, and/or the like. POs may include pages for one or more WTRUs and/or the POs may include system information change pages which may be directed to one or more (e.g., each) of the WTRUs.

In Connected Mode, a WTRU may receive pages related to a system information change. The WTRU may not receive WTRU-specific pages, such as those that may be used for an incoming call. A WTRU in the Connected Mode may not monitor a specific PO. For FDD, the PO subframes may be limited to subframes, such as subframes 0, 4, 5, and/or 9. For TDD, the PO subframes may be limited to certain subframes, such as subframes 0, 1, 5, and/or 6.

A WTRU may (e.g. following transmission of a random access preamble) monitor for an RAR. A WTRU may determine whether a preamble was received (e.g. successfully), for example, based on whether the WTRU received an RAR intended for it within an RAR window.

In an example (e.g. for an unlicensed band), an RAR may not be sent, for example, when a channel is busy, which may delay an RAR transmission. A delayed RAR transmission may result in procedural delays, more RA collisions, and/or an inability to respond to one or more preambles (e.g. due to RAR transmission capacity).

A potentially delayed RAR transmission may result in use of a long RAR window that may, for example, delay initial access or other procedures, e.g., even when a channel is not busy.

A delayed RAR transmission may result in WTRUs in multiple different frames transmitting in the same subframe, which may lead to RA-RNTI confusion and more opportunities for collisions (e.g. WTRUs may select the same preamble and may use the same RA-RNTI that may be based on a transmission subframe).

A delayed RAR transmission may result in a need for more RARs to be transmitted (e.g. simultaneously), e.g., to handle more WTRU preamble transmissions. The number of RARs that may be supported may be limited, for example, by control channel capacity (e.g. for RA-RNTIs) or data channel capacity (e.g. limited by allowed transport block size for RAR).

A WTRU that performs a CCA for transmission on specific time period boundaries, such as SF boundaries (e.g. to transmit an RA preamble), may be at a disadvantage for accessing a channel with respect to another device (e.g. a WiFi device) that may not be constrained to specific boundaries for CCA or transmission.

Paging may be delayed. A WTRU may monitor for a paging signal and/or may determine whether the WTRU was paged, for example, based on whether the WTRU receives a paging signal (e.g., a paging signal intended for the WTRU within a paging window). In an unlicensed band, a paging signal may not be sent, for example, when the channel is busy during the paging occasion (PO) (e.g., which may delay the paging). Delayed paging may result in a delay in initial access, for example, when the channel is not busy.

RAR reception may be provided with RAR window adaptation. A WTRU may monitor for an RAR in an RAR window. An RAR window may have a first RAR window size. A WTRU may monitor for an RAR in one or more monitoring periods (e.g. monitoring time periods). A WTRU may determine (e.g. in or for a monitoring period) whether an eNB transmitted or may transmit (e.g. one or more signals or channels). A WTRU may modify or adapt (e.g. increase) an RAR window (e.g. size), for example, when the WTRU determines that an eNB did not transmit in a monitoring period or in a number of monitoring periods greater than a threshold.

A WTRU may increase (e.g., extend) an RAR window, for example, by an amount or size (e.g. window increase step size), which may be configured. A WTRU may change an (e.g. a first) RAR window size to another (e.g. a second) RAR window size. One or more (e.g. first and/or second) window sizes may be configured.

A receiver may determine whether a DL transmission occurs. A first node (e.g. an eNB) may transmit or use a signal that may be configured or otherwise known to a second node (e.g. a WTRU). A signal may indicate, or may be used to indicate, for example, at least one of: a) whether a first node has (e.g. is using) an unlicensed channel on which the signal may be (e.g. is) transmitted, b) a valid transmission by the first node, c) a start of a transmission (e.g. downlink transmission or sidelink transmission), and/or d) a start or presence of a downlink transmission or a period where a downlink transmission may be possible or may occur.

A first node may transmit a signal after performing a CCA, for example, when the first node determines a channel is free. Presence or detection of a signal may, for example, enable a second node (e.g. a WTRU) to determine the presence or start of a transmission (e.g. a valid downlink transmission) by the first node.

A WTRU may monitor (e.g. search) for a (e.g. specific) signal transmission (e.g. by an eNB or other node or transmitter) that may, for example, indicate whether an eNB has a channel or indicate a (e.g. valid) transmission by the eNB. Monitoring or a search may be over one or more candidate time and/or frequency locations. A WTRU may use a cross-correlation operation, for example, to search for a signal transmission. A signal may be configured (e.g. by an eNB) and/or known by a WTRU. A WTRU may determine that an eNB has a channel, is transmitting, and/or is able to transmit on the channel, for example, when the WTRU detects, (e.g. successfully) receives, and/or decodes a signal.

A WTRU may monitor (e.g. search) for a signal transmission in a monitoring period. A monitoring period may, for example, be one or more subframe(s), slot(s), mini-slot(s), symbol(s), etc. A monitoring period (e.g., an RAR window) may be, for example, a time period during which a WTRU may monitor for an RAR, for example, the WTRU may monitor a control channel or data channel that may be associated with or carrying an RAR. A WTRU may monitor for or search for a signal before or during (e.g. at or near the beginning of) a monitoring period.

In an example, a signal transmission may occur in advance of the start of a downlink control channel (e.g. PDCCH). A signal transmission may occupy specific time-frequency resources (e.g. PRBs) that may be configured and/or known.

A signal may be, for example, at least one of: a) a reference signal (RS) (e.g. a Cell Specific Reference Signal (CRS)); b) a sequence (e.g. a specific sequence) of bits; c) a Discovery Reference Signal (DRS) (e.g. including one or more synchronization signals and/or reference signals); d) a sequence; and/or e) a PHICH or a PHICH-like signal or channel. A synchronization signal (SS) may be, for example, a primary SS (PSS) or a secondary SS (SSS). An RS may be, for example, a CRS, a DM-RS, a CSI-RS, etc. A signal may be, for example, a control channel that may be masked, e.g., with an RNTI such as an SI-RNTI, RA-RNTI, or P-RNTI.

A WTRU may monitor for, detect, and/or use a signal (e.g. a tx-signal) to determine whether there is a (e.g. valid) downlink transmission or whether a node or transmitter has or may be using a channel. A tx-signal may be or may indicate a (e.g. valid) downlink transmission.

A WTRU may monitor for a tx-signal from, for example, a cell or an eNB on which the WTRU is camped or to which the WTRU transmitted a preamble and/or from which the WTRU may receive or attempt to receive an RAR.

RAR window size adaptation may be provided. One or more parameters that may be associated with an RAR window may be configured. RAR parameters may include, for example, a window start time and/or window length (e.g. window size), which may be default or initial values. One or more RAR window adaptation parameters may (e.g. also) be configured. RAR window adaptation parameters may include, for example, at least one of: maximum window size, window increase step size, and/or threshold (e.g. of non-detected transmissions) for window adaptation. A configuration of one or more parameters may be communicated to a WTRU, e.g., in system information.

A WTRU may increase an RAR window, for example, based on a determination of whether, how often, and/or how many times an eNB does not transmit an RAR (e.g. due to a channel being busy).

Window size may be in terms of time units or time periods, such as monitoring periods. In an example, one or more of window size, maximum window size, and window increase step size may be in terms of (e.g. a number of) monitoring periods, such as subframes or slots.

A WTRU may determine an RA-RNTI to use for RAR reception. A determination may be based on a time and/or frequency of a WTRU's preamble transmission.

A WTRU may monitor for a tx-signal in or for a monitoring period. The tx-signal may be, for example, an RAR and/or an RS. The monitoring period may be an RAR window, and the RAR window may have an RAR window size. The RAR window may be composed of one or more subframes. A WTRU may determine that an eNB transmitted an RAR in a monitoring period, for example, when a tx-signal is detected (e.g. successfully received and/or decoded).

A WTRU may monitor for an RAR DCI that may be masked with its determined RA-RNTI in a monitoring period, for example, when a WTRU determines that an RAR is transmitted.

A WTRU may retry (e.g. to determine transmission presence and/or to receive an RAR) during or for a next monitoring period, for example, when the WTRU does not (e.g. successfully) receive an RAR DCI with its RA-RNTI. A retry may include, for example, monitoring for a tx-signal before or during a next monitoring period.

A WTRU may receive an associated, allocated, or indicated data channel (e.g. PDSCH) that may carry one or more RARs, for example, when the WTRU (e.g. successfully) receives an RAR DCI with its RA-RNTI. A WTRU may determine whether an RAR that may be in a DCI or carried by a data channel includes a preamble index that matches a preamble index the WTRU used for RA preamble transmission. A WTRU may (e.g. when a matching preamble index is detected or found) transmit a response (e.g. a message), for example using resources that may be indicated by an uplink grant in an RAR. A WTRU may (e.g. when a matching preamble index is not found) wait for a next monitoring period, e.g., to try again (retry).

A WTRU may increase (e.g., extend) an RAR window size, for example, when the WTRU does not receive or detect a tx-signal in or for a monitoring period (e.g. a current monitoring period) or determines that an eNB does not transmit an RAR in a monitoring period (e.g. a current monitoring period). A WTRU may increase an RAR window size, for example, by a configured RAR window increase step size. A WTRU may determine whether to increase the RAR window size, for example, at the end of a subframe of the monitoring period. The subframe may be a last subframe of the monitoring period. An initial size of an RAR window may be configured with an initial or default window size. In an example, a WTRU may increase an RAR window size (e.g. by an increase step size), for example, when (e.g. each time) the WTRU does not receive or detect a tx-signal, or determine that an eNB did not transmit an RAR. A WTRU may increase an RAR window size (e.g. by an increase step size) for every N times a WTRU does not receive or detect a tx-signal or determines that an eNB does not transmit an RAR. N may be a configured threshold value.

A WTRU may increase an RAR window size (e.g. by an increase step size), for example, when an RAR has not been received in a monitoring period and a tx-signal (e.g., an RS) has been received in less than a threshold amount of subframes of the monitoring period. The threshold amount may be a fixed number of subframes (e.g., less than a number of subframes in the monitoring period) where the tx-signal has been received in the RAR window. The WTRU may increase the RAR window size, for example, if the RAR window size is less than a maximum window size. The WTRU may transmit a preamble at a higher power, e.g. if the tx-signal has been received the threshold amount of times or more than the threshold amount of times.

A WTRU may increment a counter and may increase an RAR window size, for example, when a counter reaches or exceeds a configured threshold value. A WTRU may increment a counter, for example, when (e.g. each time) the WTRU does not receive or detect a tx-signal or determines that an eNB may not transmit an RAR.

A WTRU may use an adaptive step size that may increase or decrease in size, for example, based on a number of failures, e.g., repeated failures, to detect a tx-signal. A WTRU may expand an RAR window size by a larger step size, for example, upon repeated failures to detect valid downlink transmissions in successive monitoring periods. An adaptive step size determination may be linear or non-linear (e.g. exponential).

A WTRU may cap a window size at a maximum window size, which may be configured. A WTRU may not increase a window size after a window size reaches or is capped at the maximum. A WTRU may reset a window size to an initial or default value, for example, when the WTRU starts a new RA procedure. In an example, a (e.g. maximum) number of times a WTRU may increase a window size may be configured. A WTRU may not increase a window size, for example, after the WTRU has increased the window size a maximum number of times.

A WTRU may transmit another preamble, for example, when the WTRU has not received an RAR (e.g. for a preamble the WTRU previously transmitted) within an RAR window (e.g. after the window has reached a maximum size or been increased a maximum number of times). A WTRU may transmit a preamble at a higher power.

A WTRU may choose another channel and/or another beam for transmission of a preamble, for example, when the WTRU does not detect a tx-signal and/or determine that an eNB has not been able to get a channel more than a threshold (e.g. a second threshold) number of times.

A failed monitoring period may be a monitoring period in or for which a WTRU does not detect a tx-signal (e.g. from an eNB). A failed monitoring period may be a monitoring period in or for which a WTRU determines that an eNB may not transmit a valid transmission and/or an RAR, for example, when the eNB may not have been able to get a channel for transmission. The eNB may be an eNB to which the WTRU transmitted a preamble.

Figure 2:
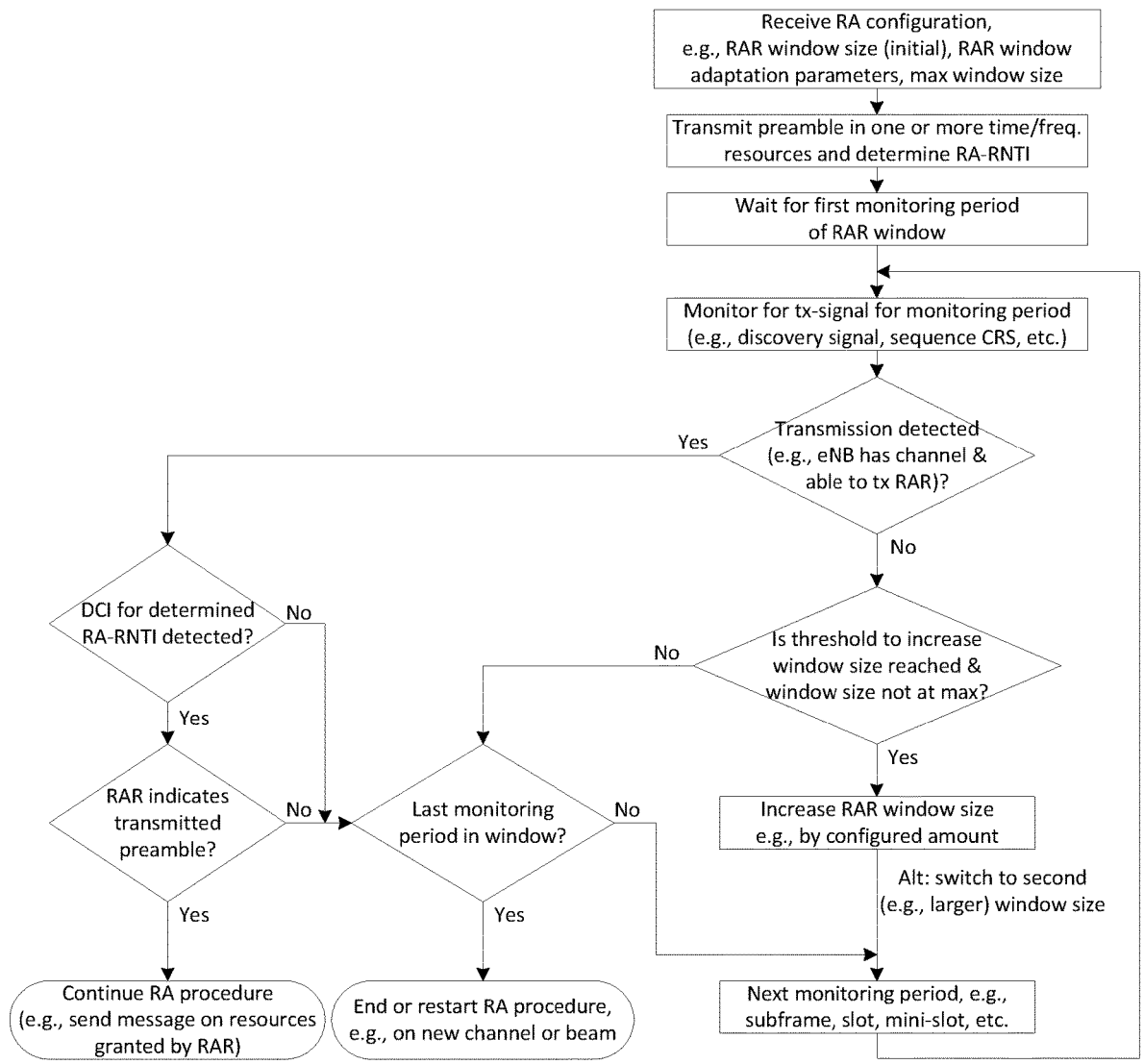
FIG. 2 is an example of an RAR window size adaptation.

FIG. 2 is an example of an RAR window size adaptation. FIG. 2 shows an example of WTRU behavior associated with an RAR transmission in unlicensed spectrum. In an example, a WTRU may increase an RAR window size or use another (e.g. an alternate or a second) RAR window size, for example, when a number of failed monitoring periods exceeds a threshold.

Window adaption may be performed, for example, by a WTRU. An eNB may (e.g. also) adapt an RAR window size. Window size adaptation by an eNB may, for example, be based on an inability of the eNB to gain access to a channel (e.g. within a current window) to send a RAR. An eNB may adapt a window according to rules that an WTRU may follow. In an example, a WTRU and eNB may use the same or similar window sizes. In an example, an eNB may adapt a window size, for example, when it (e.g. successfully) receives a preamble and is unable to access a channel for RAR transmission. An eNB may adapt a window size after a number of failed attempts to access a channel. An attempt may be for a WTRU monitoring period and/or an eNB transmission period. The number may be a number that may be configured for and/or used by a WTRU. An eNB may cap a window size at a maximum value.

Multiple RAR windows may be provided. RAR parameters and/or RAR window adaptation parameters may include one or more RAR window sizes. A WTRU may begin with and/or may use a first window size. A WTRU may switch to a second window size, for example, when the WTRU does not detect a tx-signal in or for a monitoring period or for a number of monitoring periods. In an example, a WTRU may switch to a second window size, for example, when a number of failed monitoring periods exceeds a threshold or exceeds a threshold while using a (e.g. first) window size.

A WTRU may be configured with a set of RAR window sizes and/or one or more thresholds. A WTRU may be configured with a threshold that may be associated with (e.g. each of) one or more window sizes. A WTRU may switch to another (e.g. a next or a second) window size (e.g., a next higher or larger window size), for example, when the WTRU is using a (e.g. first) window size and a number of failed monitoring periods exceeds a threshold that may be associated with a first window size.

A window size may be associated with a window start time. A window start time may be associated with a time (e.g. a first or last time period) of a WTRU's preamble transmission. A start time may be a number of time periods after a time of a preamble transmission.

An RA-RNTI determination may be based on SFN. A WTRU may transmit a preamble in a frequency resource in a time period (e.g. a subframe). A frequency resource may be selected by a WTRU from among a set of frequency resources that may be configured for use and/or used for preamble transmission. A (e.g. each) resource may have an index associated with it. A WTRU may determine an RA-RNTI to monitor for RAR reception based on, for example, at least one of a subframe number (e.g. within a frame) or an index of a frequency resource that may be within a set of frequency resources.

Determination of an RA-RNTI (e.g. based on subframe number and/or frequency index) may not be sufficient or optimal, for example, when there is a long delay until a RAR is transmitted and/or received. In examples (e.g. during a delay), multiple (e.g. many) WTRUs may transmit a preamble in a same subframe number and a (e.g. one) RA-RNTI may (e.g. need to) be used to send an RAR for the multiple WTRUs.

A WTRU may determine (e.g. calculate) an RA-RNTI, for example, based on one or more (e.g. additional) parameters of or associated with a WTRU's preamble transmission, e.g., to reduce a number of WTRUs that may use the same RA-RNTI. Parameters may include, for example, at least one of a System Frame Number (SFN), a beam, a numerology, a subband, or a narrowband.

An SFN may be an SFN of a frame when a WTRU started or ended a preamble transmission.

A beam may be from an eNB or a DL beam from which a WTRU may receive, for example, at least one of a synchronization (sync) signal, sync burst, and/or sync block. A beam may be a WTRU transmit beam that a WTRU may use for transmission of a preamble. A beam may be an eNB receive beam that an eNB may use for reception of a preamble. A beam may correspond to and/or may be represented or indicated by an index to a set of resources (e.g. time and/or frequency resources). A WTRU may use the set of resources for transmission of a preamble.

A numerology may be used by a WTRU, for example, when transmitting a preamble. A subband or narrowband may be used by a WTRU, for example, to transmit a preamble.

A WTRU may determine (e.g. calculate) an RA-RNTI based on, for example, at least part of an SFN (e.g. starting or ending SFN) of a preamble transmission. In examples, a WTRU may use a number of Least Significant Bits (LSBs) of an SFN in a determination or calculation. A Number of LSBs (NL) that may be used may be configured, for example, via System Information (SI). In an example, a WTRU may be configured to use NL LSBs of an SFN. A value of NL may be, for example, 2 or 3. NL LSBs of an SFN may be used, for example, in addition to using a subframe number.

A WTRU may monitor for a determined RA-RNTI, for example, by monitoring a control channel or DCI masked with a determined RA-RNTI. An eNB may perform the same calculation, for example, to determine an RA-RNTI to use to send an RAR to a WTRU.

Variable PRACH frequency resources may be provided. A WTRU may be configured with one or more frequency resources that may be used for PRACH and/or preamble transmission. Different frequency resources may be used in different frames. In an example, frequency resources (e.g. frequency resource indices) that may be used for transmission may be a function of an SFN (e.g. starting or ending SFN) of a transmission.

A WTRU may be configured with a set of frequency resources. A frequency resource index may indicate a frequency resource within the set of frequency resources. A WTRU may be configured with one or more sets of frequency resources. A frequency resource index may indicate a set of frequency resources and a frequency resource within the set of frequency resources. A frequency resource index may be, for example, a PRB number or index.

A time period (e.g. a subframe or slot) may be within a frame that may have an SFN. A set of frequency resources that may be used for a preamble or PRACH transmission in a time period may be a function of an SFN. A function may be based on a subset of bits of an SFN, such as a number of LSBs, MSBs, or other bits of an SFN.

A WTRU may determine a frequency resource for transmission from a set of frequency resources that may be used. A WTRU may (e.g. randomly) select a frequency resource. A WTRU may determine an RA-RNTI to monitor for RAR reception, for example, based on a determined frequency resource (e.g. based on a frequency resource index).

An eNB may perform the same calculation to determine an RA-RNTI to use for sending an RAR to a WTRU.

Variable time and/or frequency resources may be provided for RAR transmission. Time and/or frequency resources that may be used for transmission of an RAR (e.g. in response to a preamble transmission) may be, for example, a function of at least one of: a) an SFN (e.g. a starting or ending SFN) of a preamble transmission, b) numerology of a preamble transmission, and/or c) a beam of a preamble transmission. A function of an SFN may be, for example, a function of a subset of bits of the SFN, such as a function of a number of LSBs, MSBs, or other bits of an SFN.

A WTRU may determine time and/or frequency resources to monitor for RAR reception, for example, based on an SFN of a WTRU's preamble transmission. A WTRU may monitor for its determined RA-RNTI in determined time and/or frequency resources. A WTRU may monitor for a tx-signal prior to or during a time when the WTRU may monitor for an RA-RNTI.

An eNB may determine time and/or frequency resources for RAR transmission, for example, based on an SFN of a received preamble transmission. An eNB may transmit an RAR DCI, for example, using an RA-RNTI (e.g. for a received preamble transmission) in determined time and/or frequency resources. An eNB may transmit a tx-signal, for example, prior to or during a time when the eNB may transmit an RA-RNTI masked control channel.

RAR capacity enhancement may be provided. An RA-RNTI may be used for a set of time and/or frequency responses. A (e.g. one) RA-RNTI may be used, for example, for an RAR that may correspond to preamble transmissions in multiple time periods (e.g. subframes or slots) and/or frequency resources. An RA-RNTI may be determined (e.g. calculated), for example, based on a set or window of time periods (e.g. frames, subframes, slots) and/or based on a set of frequency resources.

A set of preambles may be split (e.g. into subsets) among a set of time periods and/or frequency resources, for example, so that multiple WTRUs may not use the same preamble in different time periods or frequency resources in the same window or set.

A set of preambles may be split among a set of time periods and/or frequency resources, for example, according to a configuration. A set of preambles may be split among a set of time periods and/or frequency resources, for example, according to a function of (e.g. may be determined based on) at least one of: a) an SFN, b) a subframe number within a frame or set of frames, and/or c) a slot number or mini-slot number within a subframe, a set of subframes, a frame, and/or a set of frames. In an example, subsets of preambles may not overlap. In an (e.g. another) example, subsets of preambles may overlap.

In an example, an RA-RNTI may be associated with a set or a window of time periods and/or frequency resources. A subset of preambles (e.g. from among a set of preambles) may be associated with and/or may be used with a subset of time periods and/or frequency resources. An association may be configured and/or determined. In an example, a subset of preambles that may be associated and/or used with a subset of time periods and/or frequency resources may be, for example, a function of (e.g. may be determined based on) at least one of: a) an SFN, b) a subframe number within a frame or set of frames, or c) a slot number or mini-slot number within a subframe, a set of subframes, a frame, and/or a set of frames.

A WTRU may determine a time period and/or a frequency resource for a preamble transmission. A time period may be within a set or window of time periods. A frequency resource may be within a set of frequency resources. A WTRU may determine a subset of preambles that may be used for transmission for a determined time period and/or a determined frequency resource. A WTRU may determine a subset of preambles, for example, based on how a set of preambles may be split among a set of time periods and/or frequency resources.

A WTRU may select (e.g. randomly) or determine a preamble from among the determined subset of preambles. A WTRU may transmit a selected (e.g. determined) preamble, for example, in at least a determined time period and/or a determined frequency resource.

A WTRU may determine an RA-RNTI to monitor for RAR reception, for example, based on a set of time periods and/or a set of frequency resources that a determined time period and/or frequency resource may belong to. A WTRU may monitor for a determined RA-RNTI for RAR reception.

An RAR (e.g. an RAR message or the contents of an RAR) may indicate or may include, for example, an indication of at least one resource in time, frequency, and/or beam. Resource(s) indicated may be used for transmission of a preamble that an RAR may be responding to. Resource(s) indicated may include or be a resource where an RA preamble was detected (e.g. by an eNB or a sender of an RAR). A resource indication may identify a resource within a set or subset of resources that may be available for use during a time period that may correspond to an RA-RNTI (e.g. associated with an RAR or a control channel of an RAR). A resource indication may be an index that corresponds to a resource in a set or subset of resources that may be configured. A (e.g. small) number of bits may be used for a resource indication.

In examples, a (e.g. one) RA-RNTI may be determined for an RA-RNTI window. An RA-RNTI window may be or may include a set of (e.g. consecutive) time periods (e.g. frames, subframes, or slots) that may span multiple frames. An RA-RNTI window may be or may include a set of RACH occasions (e.g. consecutive RACH occasions) that may have different time and/or frequency allocations.

A WTRU may determine an RA-RNTI, for example, based on an RA-RNTI window in which it may transmit a preamble. A WTRU may monitor for a control channel or DCI that may be masked by a determined RA-RNTI. A WTRU may use a determined RA-RNTI, for example, to unscramble (e.g. a CRC of) a control channel or DCI.

A set of (e.g. available) preambles within an RA-RNTI window may be divided into multiple subsets. A (e.g. each) subset may be assigned (e.g. by configuration) to a time period or a set of time periods within a window.

A WTRU may transmit an RA preamble in a time period (e.g. subframe) within an RA-RNTI window. A WTRU may determine (e.g. select) a time, frequency, and/or beam resource that may be available for PRACH transmission, for example, in a time period (e.g. subframe) and/or an RA-RNTI window. A WTRU may select a preamble (e.g. a preamble sequence and/or index), for example, from a subset that may be associated with a time period. A WTRU may transmit a determined preamble in and/or using determined resources in time, frequency, and/or beam (e.g. spatial direction).

A WTRU may monitor for a DCI (e.g. RAR DCI) within an RAR window, for example, using a determined RA-RNTI.

An RAR (e.g. an RAR message) may comprise a preamble identifier (e.g. index) that may identify a preamble that the RAR may respond to. An RAR may (e.g. also) comprise at least one resource indication (e.g. identifier). A resource indication may indicate (e.g. identify), for example, one or more (e.g. a combination) of: a) a time resource, b) a frequency resource, or c) a beam resource. A resource identifier may or may be used to identify a time, frequency, and/or beam resource that may be used for transmission of a preamble an RAR may respond to.

A WTRU may receive a DCI (e.g. RAR DCI) using its determined RA-RNTI. Downlink Control Information (DCI) may include at least one RAR. DCI may be associated with (e.g. allocate or grant resources for) a data channel that may include or carry at least one RAR. A WTRU may receive and/or decode one or more RARs. A WTRU may check at least one resource indication in one or more RARs. A WTRU may determine whether an RAR is intended for it (e.g. may be responding to its preamble transmission), for example, based on at least one resource indication. In examples, a WTRU may determine that it received an RAR that is intended for it, for example, when the WTRU determines that the RAR comprises at least one resource indication that matches a resource the WTRU used for preamble transmission. A WTRU may make a determination, for example, (e.g. only) when an RAR (e.g. also) indicates (e.g. comprises an index or identifier for) a preamble the WTRU transmitted.

An RAR may contain multiple resource indications (e.g. multiple types of resource indications). A WTRU may make a determination that an RAR may be intended for it, for example, when one or more (e.g. all) resource indications match a resource the WTRU used for transmission of a preamble.

A WTRU may determine that an RAR may not be intended for it, for example, when at least one resource indication does not match a resource the WTRU used for transmission of a preamble.

In an (e.g. another) example, a set of preambles (e.g. within an RA-RNTI window) may be divided into subsets, for example, so there may be a subset for one or more combinations (e.g. each combination) of a time period (e.g. subframe), frequency, and/or beam resource. An RAR may (e.g. not) contain a time, frequency, and/or beam resource identifier to specify a resource where an RA preamble may be detected.

An RA-RNTI window, preamble subset, time, frequency, and/or beam resource identification configurations, etc. may be communicated to a WTRU (e.g. in SI).

CCA window dither and/or retry delay may be provided.

Dither implementation(s) may include one or more of the following.

An RA transmission may be a (e.g. any) UL transmission that may be performed by a WTRU without a specific UL grant (e.g. an RA transmission, grant-free or grant-less transmission, on-demand SI request, or probing signal). A probing signal may, for example, enable mobility.

Random access preamble transmission occasions may be, for example, WTRU-specific, group-WTRU specific or cell-specific. There may be a collision of preamble transmissions from multiple WTRUs, for example, when multiple WTRUs share an RA preamble transmission occasion. A network may resolve collisions, for example, when different preamble sequences and/or beams may be used.

A WTRU (e.g. in an unlicensed channel) may, for example, perform a channel evaluation, e.g., to determine whether a channel may be unused (e.g. LBT) before transmitting an RA preamble. LBT may reduce a number of colliding RA preamble transmissions, for example, given that a channel may not appear the same to all WTRUs that may perform an RA to a cell/eNB/gNB.

A WTRU may begin an LBT procedure before (e.g. 25 us before) a transmission occasion, for example, to enable transmission of an RA preamble at a specific time. In an example (e.g. for group-WTRU-specific or cell-specific RA preamble occasions), multiple WTRUs may perform LBT at the same time, for example, to determine an availability of a channel for transmission of an RA preamble. Multiple WTRUs may determine a channel is unoccupied and may begin transmitting their RA preambles simultaneously, which may increase a probability of preamble sequence collision.

Dithering may be used by a WTRU, for example, to reduce collision probability. Dither(ing) may refer to a time offset that a WTRU may add, for example, to one or more of the following: (i) a beginning of an LBT procedure; (ii) a duration of an LBT procedure (e.g. a number of clear channel assessments performed); (iii) the end of an LBT procedure; (iv) a beginning of the RA preamble transmission; and/or (v) a gap between an LBT procedure (e.g. that may determine a channel is clear) and a beginning of transmission of an RA preamble. In an example, a WTRU may have a controllable and/or configurable switching time between the end of a successful LBT procedure and the beginning of a transmission of an RA preamble.

A dithering value may be negative or positive (e.g. adding time to when a procedure may begin), for example, so a CCA may end at a start of a specific transmission opportunity or later.

Dithering may be configurable. In an example, a WTRU may receive (e.g. essential) SI that may indicate whether dithering may be involved with (e.g. required for) Random Access to a cell. In an (e.g. another) example, a WTRU may (e.g. always) dither, for example, when attempting RA preamble transmission to an unlicensed cell.

In an (e.g. another) example, a WTRU may determine whether to apply dither, for example, based on measurements or factors that may be associated with a transmission by a WTRU. In an example, whether a WTRU may dither may depend on, for example, one or more of the following: (i) a purpose of a transmission (e.g. whether a WTRU may be performing a transmission for initial access, on-demand SI request, grant-less or grant-free transmission, TA timer expiration or probing for mobility); (ii) whether a WTRU may be performing a transmission based on a RACH order (e.g. WTRU may not dither when assigned contention-free RA preamble resources); (iii) a total number of contention-based preambles that may be available for RA (e.g. a WTRU may dither when a number of contention-based preambles is less than a threshold value); (iv) service (e.g. reliability and/or latency) requirements (e.g. a first UL transmission for transmitting URLLC data may not require dithering); (v) a transmission BW; (vi) a beam or beam type (e.g. beam width) that may be used for a UL transmission or LBT measurements; and/or (vii) whether transmission may be performed on a PCell or SCell, and/or to an MeNB (MgNB) or SeNB (SgNB).

A dither value may be selected. A WTRU may (e.g. upon being configured to use a dither) be configured with one or more dither values. In an example, a WTRU may determine a dither value based on, for example, one or more of the following: (i) a WTRU parameter (e.g. WTRU ID); (ii) a cell parameter (e.g. Cell ID); (iii) timing of an RA transmission (e.g. frame, subframe, slot, or symbol number); and/or (iv) a preamble that may be selected for an RA transmission.

In an (e.g. another) example, a WTRU may be configured with a range of dither values (e.g. 0 to MAX_DITHER in specific increments) from which it may select a dither value. A range may be defined, for example, in increments (e.g. of 4 us), in multiples of TA resolution (e.g. about 0.5 us), etc.

A WTRU may be configured with a value within a range. In an example, an RA order may include an index of a dither value to use. In an (e.g. another) example, a WTRU may select a dither value from within a range based on, for example, one or more of the following: (i) random selection; (ii) number of failed attempts; (iii) number of attempts remaining before power ramping (e.g. a set of possible dither values or a dither value itself may be reduced before power ramping an RA preamble transmission); (iv) RA transmission power level; (v) previously used dither value; (vi) whether TA may be used for future UL transmissions; (vii) numerology used (e.g. for RA transmission or future data transmissions); (viii) a measurement value obtained by a WTRU (e.g. measured RSRP or RSSI or any measurement value that may be obtained during LBT); and/or (ix) a BW that may be used for future transmission or a maximum BW that may be supported by a WTRU.

In an example of random selection, a WTRU may randomly select a value from within a range, for example, for every UL transmission that may involve (e.g. require) dithering.

In an example of a number of failed attempts, values within a range that a WTRU may choose from may depend on a number of previous failed attempts at transmitting the same RA. A number of failed attempts may consist of failures that may be due to one or more (e.g. a combination of) unsuccessful LBT and/or a WTRU not receiving RAR. A (e.g.) each failure type may (e.g. independently) affect the range of possible dither values.

In an example of an RA transmission power level, a WTRU may reduce a set of possible dither values or may reduce one or more dither values within a set, for example, when a WTRU is transmitting an RA at maximum power.

In an example of a previous dither value used, a WTRU may not reuse a previous dither value that was used for a same UL transmission. In an (e.g. another) example, a WTRU may reuse the same dither value, for example, when an LBT and/or preamble transmission was successful (e.g. without receiving an RAR).

Factors that may affect whether dithering may be used may (e.g. also) be used as factors by a WTRU, for example, to determine a dither value for a UL transmission.

A WTRU may, for example, indicate to a network that it used or may use dithering and/or a dither value for a UL transmission. In an example, a WTRU may (e.g. implicitly) indicate a dither value, for example, using a factor of a preamble transmission (e.g. preamble sequence). In an example, a WTRU may indicate use of dithering and/or dither value in a future transmission. In an example, a WTRU may use granted resources (e.g. e.g. granted in an RAR), for example, to indicate to a network a use and value of dither in a previous UL transmission.

A WTRU may be provided with a timing advance command, for example, based on a transmission of an RA. A WTRU may remove an effect of a dither that may be used in a transmission of an RA, for example, to determine an appropriate value of a TA that may be used for future transmissions. A WTRU may indicate a dither or an updated TA value to a network, for example, in a future transmission (e.g. msg3 transmission).

Figure 3:
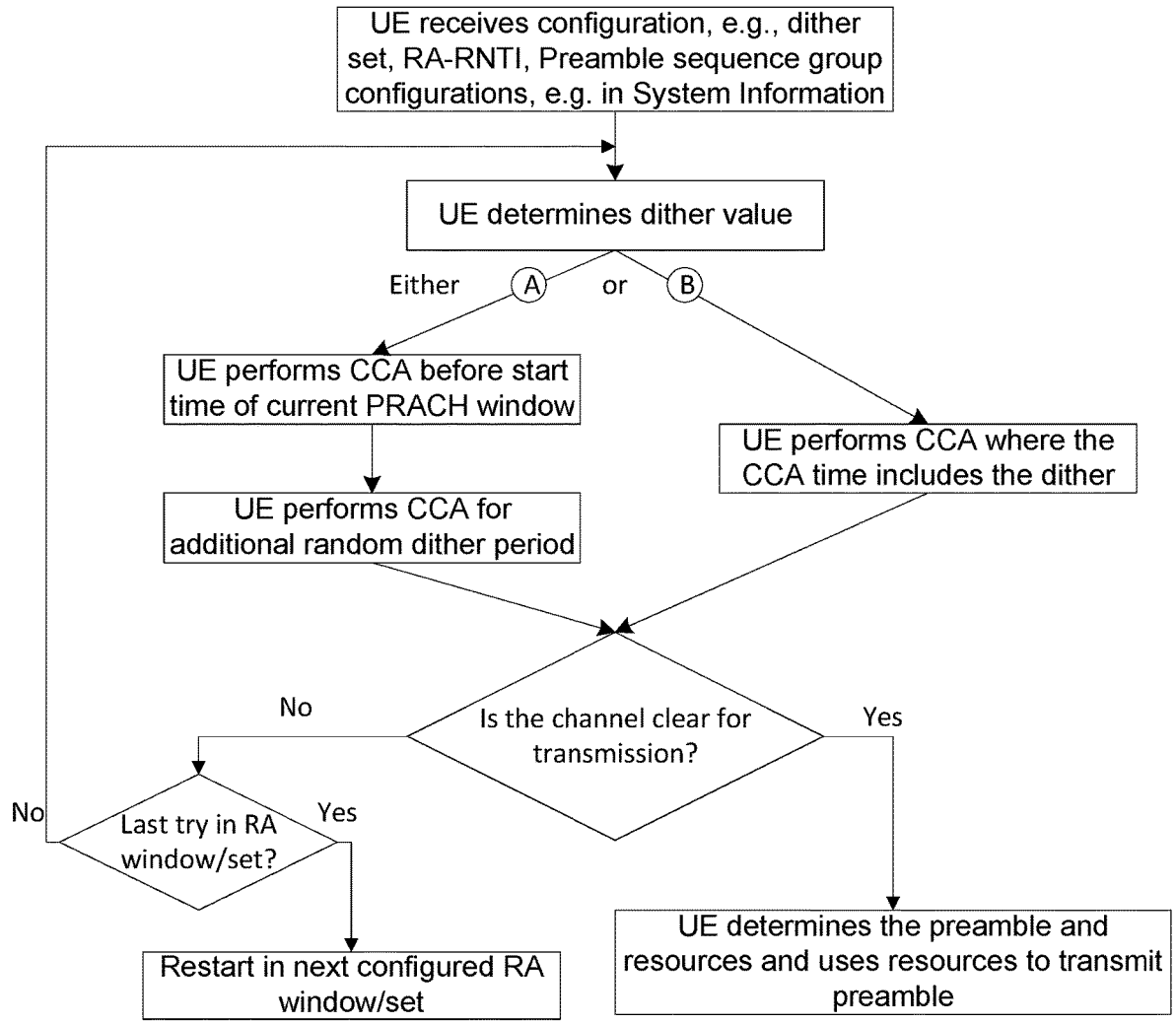
FIG. 3 is an example of Clear Channel Assessment (CCA) window dither for a RACH transmission.

FIG. 3 is an example of CCA window dither for a RACH transmission. FIG. 3 shows an example of the use of dithering by a WTRU. A WTRU may determine a dither value, for example, based on a configuration and a dither set or a dither range. A WTRU may perform LBT and/or CCA, for example, using dither. A WTRU may determine whether a channel is unused. A WTRU may restart a process, for example, when a channel is busy.

Retry delay implementation(s) may be provided herein. Retry delay implementation(s) may include one or more of the following.

A WTRU may fail to acquire a channel for transmission of an RA. A WTRU may wait until a future RA occasion occurs. A WTRU may (e.g. additionally or alternatively) attempt to acquire a channel at a future time within the same RA occasion. An RA occasion may span one or more symbols. A WTRU may attempt to acquire a channel at the beginning of an RA occasion, which may fail. A WTRU may retry to acquire a channel during the same RA occasion (e.g. using a different dither value).

A WTRU may use a time offset (e.g. retry delay) between multiple (e.g. each) attempts within an RA occasion. Use of a retry delay and a value of the time offset between RA attempts within an (e.g. one) RA occasion may be configured or determined, for example, according to one or more examples described herein for dithering.

One or more (e.g. each) attempts within an RA occasion may use the same or different dither values. A dither value that may be used for a (e.g. each) attempt may depend on how many failed attempts within an RA occasion may have occurred before a current attempt. In an example, a WTRU may (e.g. randomly) select a dither value within a dither value range. A maximum value for an (e.g. a first) attempt within an RA occasion may be set to a default value. Future maximum values may be set, for example, to a dither value that may be used in a previous attempt.

Figure 4:
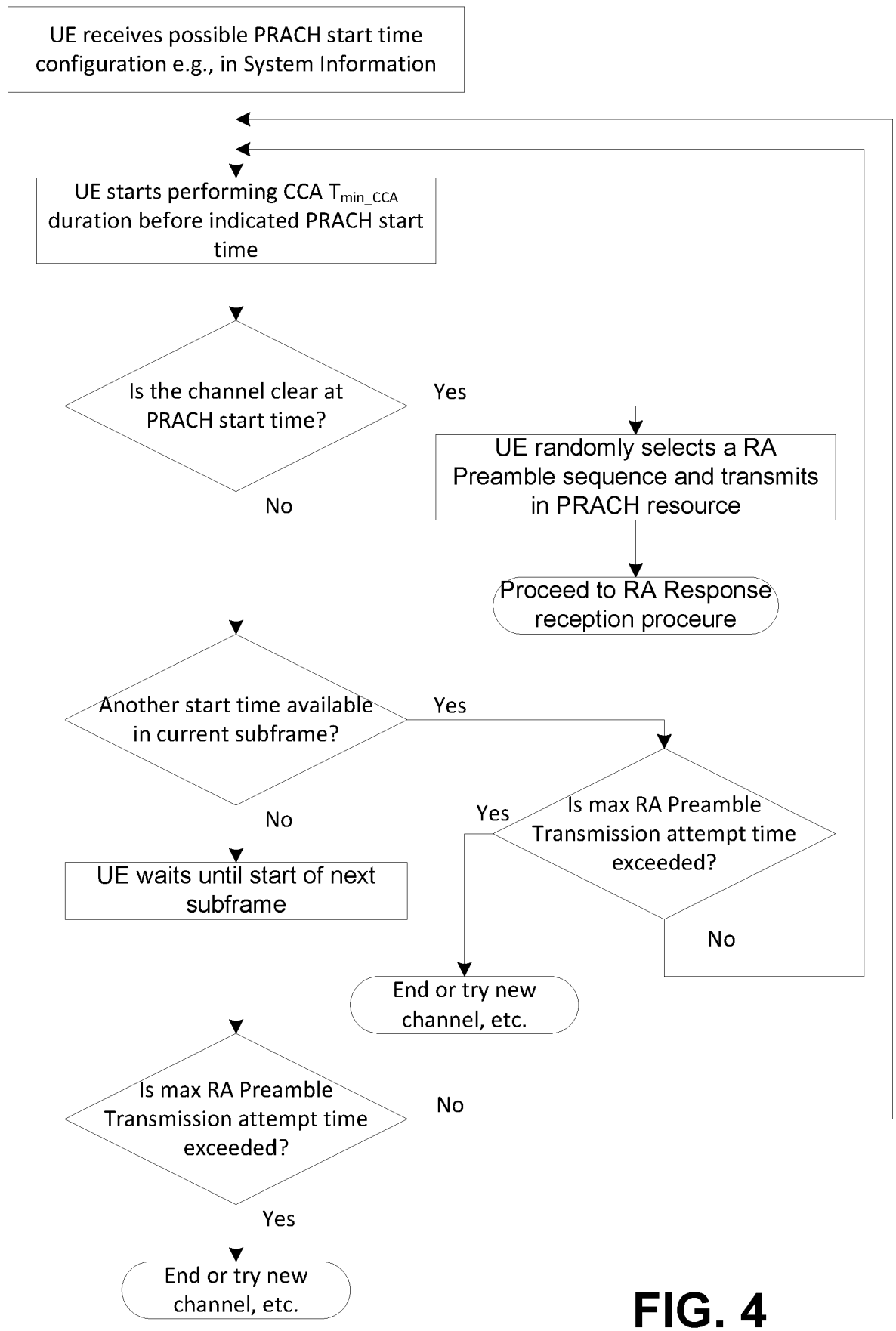
FIG. 4 is an example of a RACH transmission retry delay.

FIG. 4 is an example of a RACH transmission retry delay. FIG. 4 shows an example that a WTRU may follow to determine whether a retry delay may be applicable within an RA occasion. A WTRU may use dependent or independent dither values for an (e.g. each) attempt within and outside of an RA transmission occasion. An RA preamble transmission may occur in unlicensed spectrum with delayed transmission start within a subframe.

One or more (e.g. multiple) PRACH resource tiers may be configured and/or used. A PRACH tier may comprise one or more (e.g. a set of) PRACH resources. PRACH resources may be, for example, resources in time and/or frequency that may be used for PRACH and/or preamble transmission. A set of PRACH resources may be periodic in time. In an example, a first resource tier may comprise, for example, a first set of resources in time and/or frequency that may have a first periodicity in time. A second resource tier may comprise, for example, a second set of resources in time and/or frequency that may have a second periodicity in time. A second resource tier may, for example, provide more opportunities for PRACH transmission than the first resource tier.

A WTRU may, for example, start with a first resource tier. In examples, a WTRU may try to gain access to a channel for transmission of a PRACH preamble using resource opportunities of a first resource tier. A WTRU may try to gain access to a channel for transmission of a PRACH preamble using resource opportunities of a second resource tier, for example, when the WTRU fails to gain access after a (e.g. configured) number of tries using resource opportunities of the first resource tier.

One or more (e.g. multiple) PRACH resource tiers may be configured. A PRACH resource tier configuration may be or may include a PRACH resource configuration. A PRACH resource tier or resource tier configuration may include or may refer, for example, to one or more of the following: (i) a set of time-frequency resources that that may repeat in time (e.g. within a time period or until cancelled or reconfigured); (ii) a set of time-frequency resources that that may repeat in frequency within a time period; and/or (iii) a set of time-frequency resources that may bear a specific time-frequency relation among one another. Resources may vary or repeat in time and/or frequency.

Time-frequency and time/frequency may be used to represent time and/or frequency. Time-frequency and time/frequency may be used interchangeably.

Repetition of time and/or frequency resources may be periodic or aperiodic.

A time period may, for example, refer to a frame, subframe, slot, mini-slot, a group of frames, etc. A PRACH resource tier may, for example, consist of repetitions of a time-frequency resource pattern over successive time periods.

Multiple PRACH resource tiers may be configured with parameters or resources that may be distinct or different. Multiple resource tiers may be configured with overlapping resources. In an example, a resource tier may be configured to include PRACH resources in subframes 2 and 7 (e.g. in every frame) while another resource tier may be configured to include PRACH resources in subframe 5 (e.g. in every fourth frame).

One or more PRACH resource tier configurations may be communicated to a WTRU, e.g., in System Information.

In examples, a tier configuration may include time period (e.g. subframe) numbers for time periods (e.g. subframes) that have configured, allocated, or available PRACH resources. In an (e.g. another) example, a tier configuration may include frequency resources that may be allotted for PRACH. In examples, PRACH PRBs may be configured.

A maximum number of channel access attempts or failures for a (e.g. each) tier may be configured. A retry attempt limit may be configured (e.g. per resource tier) or may be a common limit that may be configured and/or used for (e.g. all) available (e.g. configured) tiers.

A (e.g. one) resource tier may be (e.g. designated) a default tier. A WTRU may (e.g. initially) use a default tier for RA preamble transmission, for example, before selecting a different tier.

A WTRU may perform a CCA, for example, to determine channel occupancy or availability. A WTRU may transmit a (e.g. an RA) preamble in a PRACH resource that may belong to a first (e.g. default) tier, for example, when a CCA indicates a clear channel and/or when the WTRU determines that a channel is clear.

A WTRU may defer preamble transmission (e.g. to a later time), for example, when a CCA indicates a busy channel condition and/or the WTRU determines the channel is busy.

A WTRU may use resources of a second PRACH resource tier, for example, when a WTRU fails to gain channel access to transmit a preamble (e.g. when using resources of a first resource tier).

A WTRU may try a (e.g. configured) number of times to gain channel access (e.g. using resources belonging to a first tier) before switching to another (e.g. a second) tier.

In an example, a WTRU may be configured to use different preamble sets with different index ranges for different PRACH resource tiers.

In an example, a WTRU may be configured to use the same preamble set with multiple (e.g. all) PRACH resource tiers.

An RAR (e.g. an RAR message or the contents of an RAR) may contain a resource tier identifier. A WTRU may filter RAR messages with an identification set that may include, for example, resource and/or resource tier identification. A WTRU may use information that may be contained in an RAR (e.g. uplink grant), for example, (e.g. only) when one or more (e.g. all) parameters that belong to an identification set match values used by the WTRU for RA preamble transmission. A WTRU may discard (e.g. may not use) an RAR, may determine that an RAR may not be intended for the WTRU, and/or may not be in response to the WTRU's preamble transmission, for example, when one or more identification set values contained in an RAR does not match those used for a preamble transmission.

An identification set may contain, for example, at least one of a preamble index, PRACH resource, PRACH resource tier, etc.

Figure 5:
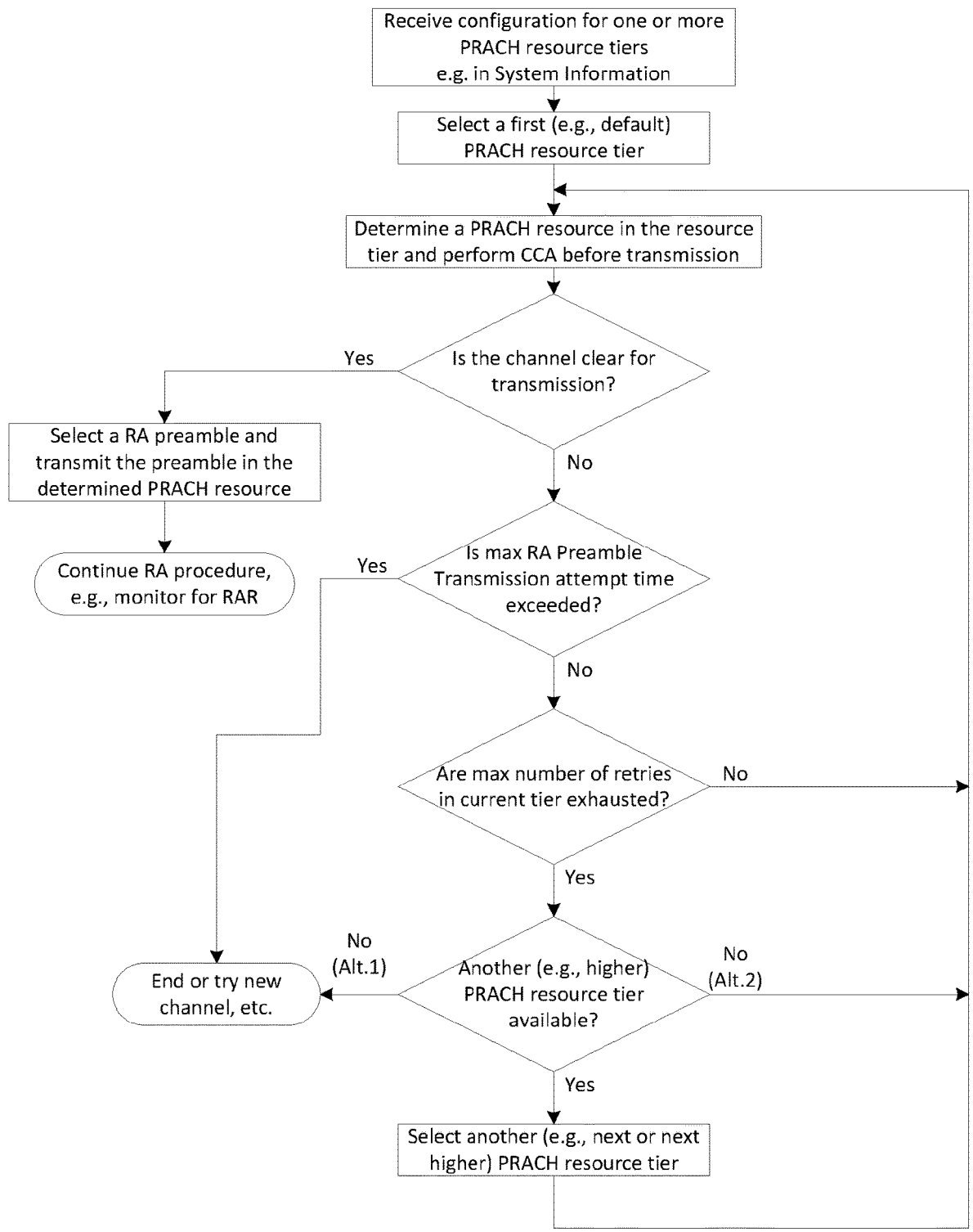
FIG. 5 is an example of RA preamble transmission using PRACH resource tiers.

FIG. 5 is an example of RA preamble transmission using PRACH resource tiers. FIG. 5 shows an example of RA Preamble transmission in unlicensed spectrum with multiple PRACH resource tiers. A WTRU may attempt to gain access to PRACH resources belonging to a first tier for a threshold number of times before switching to a second resource tier. The threshold may be configured.

There may be a maximum amount of time (e.g. a maximum number of monitoring periods) for which a WTRU may attempt to transmit a preamble, for example, before abandoning attempts (e.g. to access and/or connect) on a first channel and/or trying another a second channel. The maximum amount of time may be configured.

Tiers may be differentiated, for example, by different configurations for at least one of the following: time, frequency, PRACH format, coverage level, and/or cell.

Tiers may have different configurations for an amount or number of resources that may be allocated or available in time, e.g., for preamble transmission. In an example, a tier may have resources more often in time than another tier. In examples, a tier may have more resources per time period or set of time periods than another tier. In examples, a tier may have more groups or sets of resources (e.g. consecutive sets of resources) in time than another tier.

A (e.g. second) resource tier that may have more opportunities (e.g. in time and/or frequency) for preamble transmission than another (e.g. a first) resource tier may be (e.g. considered) a higher tier (e.g. relative to the first tier with fewer opportunities).

In examples, tiers may be associated with different types of cells. In an example, a tier may be associated with an unlicensed cell. A WTRU may (e.g. need to) perform a CCA, for example, before transmitting on resources of an unlicensed cell. Another tier may be associated with a licensed cell. A WTRU may not (e.g. need to) perform a CCA before transmitting on the resources of a licensed cell. A licensed cell tier may be (e.g. considered) a higher tier than an unlicensed cell tier. A WTRU may switch to a licensed cell tier for PRACH transmission, for example, when the WTRU fails to access a channel for PRACH transmission using resources of an unlicensed tier for a configured number of tries or for a configured amount of time.

One or more (e.g. multiple) PRACH formats may be configured and/or used. A PRACH format may be associated with and/or characterized, for example, by one or more of the following parameters: (i) Cyclic Prefix (CP) length; (ii) sequence length; (iii) Guard Time; (iv) total length; (v) sequence set; (vi) initial transmit power; (vii) transmit power adaptation step size; (viii) transmit power adaptation threshold; and/or (ix) periodicity.

Multiple PRACH formats may be configured with one or more parameters that may be different or distinct. Multiple formats may be configured with one or more of the same parameters. In examples, multiple PRACH formats may differ in sequence length and/or initial transmit power. In examples, a PRACH format may include a shorter sequence length and/or a lower initial transmit power than another PRACH format.

One or more PRACH format configurations may be communicated to a WTRU (e.g. in System Information). In an example, a configuration of a format may include values for one or more (e.g. all) parameters. Default values may (e.g. additionally or alternatively) be assigned to one or more parameters and (e.g. only) non-default parameter values may be specified. Time and/or frequency resources for a (e.g. each) PRACH format may be configured (e.g. in terms of repetition periodicity and a start time). A start time may be, for example, absolute (e.g. SFN, subframe number) or relative (e.g. with respect to a first SFN of a current PBCH window).

A maximum number of channel access attempts per PRACH format may be configured. A retry attempt limit may be configured per PRACH format or a common limit may be configured for multiple (e.g. all) available formats. A maximum time limit per PRACH format may be specified.

A level, order, or priority may be configured for one or more formats. A WTRU may (e.g. first) use a PRACH format with a first level, order, or priority for RA Preamble transmission, for example, before choosing a format with a second level, order, or priority. A second level, order, or priority may be higher (or lower) than a first level, order, or priority.

A WTRU may perform a CCA, for example, to determine channel occupancy. A WTRU may transmit an RA preamble with a PRACH resource using a current or determined PRACH format, for example, when a CCA indicates a clear channel and/or the WTRU determines a channel is clear.

A WTRU may defer an RA preamble transmission, for example, when a CCA indicates a busy channel condition and/or the WTRU determines the channel is busy.

A WTRU may (e.g. when it fails to gain channel access to transmit an RA preamble) switch to a PRACH format with another (e.g. higher or lower) level, order, or priority, for example, when switching conditions are satisfied. A WTRU may continue using a current PRACH format, for example, when format switch conditions are not satisfied.

Licensed cell assistance may be provided. One or more PRACH resource tiers may be configured and/or used. A resource tier may include PRACH resources from one or more cells or types of cells. A PRACH resource tier may include or refer to PRACH time-frequency resources that may belong or correspond, for example, to at least one of: (i) a cell that may be operating in an unlicensed frequency band or channel; (ii) a cell that may be operating in a licensed frequency band or channel; and/or (iii) a cell that may be operating in a shared frequency band or channel.

Multiple PRACH tiers may be configured with one or more different or distinct parameters. In an example, multiple PRACH tiers may be configured, for example, so that one tier belongs to a cell that is operating in an unlicensed frequency band or channel and another tier belongs to a cell that is operating in a licensed frequency band or channel. In an (e.g. another) example, multiple tiers may be configured to use PRACH resources that belong to cells that operate in different bands or channels in unlicensed spectrum.

One or more PRACH tier configurations may be communicated to a WTRU, e.g., in System Information.

A maximum number of channel access attempts per PRACH tier may (e.g. also) be configured. A retry attempt limit may be configured per PRACH tier or a common limit may be configured for (e.g. all) available tiers. A maximum time limit per PRACH tier may (e.g. additionally or alternatively) be specified.

A level, order, or priority may be configured for a PRACH tier. A WTRU may, for example, use a first level, order or priority PRACH tier for RA Preamble transmission before selecting a second PRACH tier that may have a higher or lower level, order or priority.

A WTRU operating in an unlicensed frequency band or channel may perform a CCA, for example, to determine channel occupancy. A WTRU may initiate RA Preamble transmission in one or more PRACH resources belonging to a current tier, for example, when a CCA indicates a clear channel and/or the WTRU determines a channel is clear.

A WTRU may defer RA Preamble transmission, for example, when a CCA operation indicates a busy channel condition or a WTRU determines a channel is busy.

A WTRU may (e.g. when a WTRU fails to gain channel access to transmit an RA Preamble) switch to a PRACH tier with another (e.g. higher or lower) level, order or priority, for example, when switching conditions are satisfied. A WTRU may continue using a current PRACH tier, for example, when tier switching conditions are not satisfied.

A WTRU may switch from a first tier to a second tier (e.g. cell, channel), for example, to transmit an RA preamble. A WTRU may switch back to a first tier (e.g. for further operation), for example, when it receives an RAR in a second tier (e.g. cell, channel). A WTRU may use a Timing Advance (TA) (e.g. obtained on a cell that may be associated with a second tier), for example, for communications with a current cell (e.g. a cell that may be associated with a first tier).

Actions associated with paging signal reception may be described herein.

A WTRU may determine whether a downlink transmission may occur.

An eNB may perform CCA before the transmission of a paging signal. The eNB may or may not send a page during a paging occasion (PO), for example, depending on the LBT result. A WTRU may determine the reason for a page not being sent for the WTRU, for example, due to an LBT fail at the eNB or if there was no page for the WTRU.

During a PO, a WTRU may monitor (e.g., search) for a signal (e.g., a specific signal) transmission by an eNB (or other node or transmitter) that may indicate that the eNB has the channel and/or that the transmission by the eNB is valid. The monitoring or search may be over one or more candidate time and/or frequency locations. For example, the WTRU may use a cross-correlation to search for the signal transmission. The signal may be configured, e.g., by the eNB and/or be known by the WTRU. When the WTRU detects or receives the signal (e.g., successfully receives and/or decodes the signal) the WTRU may determine that the eNB has the channel, is transmitting, and/or is able to transmit on the channel.

The signal may be at least one of the following. For example, the signal may be a reference signal (RS) such as cell specific reference signal (CRS); a sequence (e.g., a specific sequence) of bits; a discovery reference signal (DRS) that may include one or more synchronization signals and/or reference signals; a sequence; and/or a PHICH or a PHICH-like signal or channel. A synchronization signal may be a PSS, a SSS, and/or a SS block. A RS may be a CRS, a DM-RS, a CSI-RS, etc. The signal may be a control channel, for example, that may be masked with a RNTI (e.g., a SI-RNTI, RA-RNTI, and/or P-RNTI).

If the WTRU awakens during a PO (e.g., at the start of a DRX cycle) and identifies a CRS but no page message, the WTRU may determine that the channel is free and/or the eNB does not have a page for the WTRU. The WTRU may go to sleep and/or wait for a PO (e.g., the next PO). If the WTRU awakens from a DRX cycle and does not detect a transmission from the eNB, the WTRU may adjust the time to the next PO, for example, to increase the probability of a successful page. The WTRU may go to sleep, for example, to wait for the newly adjusted PO.

Actions associated with paging opportunity adaptation may be described herein.

The PO may be periodic in time, for example, with a fixed or variable period and/or with a fixed or variable size. For example, during a PO, an eNB may determine (e.g., via LBT) that the channel is busy, may not transmit, and/or may not send a page. A WTRU may determine the channel is busy and/or may go to sleep, e.g., until the next PO. The page delivery may be delayed for a period of a paging cycle. If the channel is busy (e.g., busy again) on the next paging cycle, the page may be delayed again, etc. The page may fail.

The probability of a successful page in a channel within an interference environment may improve with an extended paging occasion (PO) window size, for example, because the opportunities to complete a page may be increased in the window period. The probability of a successful page may improve with a reduced paging cycle period, for example, because there may be opportunities (e.g., additional opportunities) for a successful page in a given time period.

A WTRU may be configured with a paging cycle (PC), which may be a WTRU-specific paging cycle or a cell-specific paging cycle. The WTRU may be configured with a monitoring paging cycle, for example, for monitoring the POs for pages. The monitoring PC may begin as the configured PC, which may be a WTRU specific or a cell specific PC. An eNB and/or a WTRU may adjust (e.g., temporarily adjust) the monitoring PC to be a fraction of the configured PC, or of the most recent monitoring PC.

Paging cycle and DRX cycle may be used interchangeably. PDCCH, NPDCCH, and MPDCCH may be used interchangeably. A time unit may be a sub-frame, a slot, or a mini-slot.

The monitoring paging cycle, the PO size, and/or the time to the next PO may be adjusted (e.g. temporarily adjusted, e.g., decreased), for example, to decrease the paging latency and increase the probability of a successful page. The monitoring paging cycle, the PO size, and/or the time to the next PO may be increased, e.g., after the successful transmission and/or reception of a page.

A monitoring paging cycle period may be decreased, for example, to a fraction of the default paging cycle (e.g., decreased by a factor of 2). Decreasing a monitoring paging cycle period to a fraction of the default paying cycle may provide twice the paging opportunities, for example, as compared to a paging cycle period that is not halved. If the interferer leaves the channel after a PO, the page may be successful sooner, for example, because the next PO may occur in half the period compared to an example with a paging cycle period that is not halved. The latency may be improved two-fold.

The time to the next PO may be reduced.

The PO duration may be increased (e.g. temporarily increased), for example, by extending the original PO by one or more adjacent sub-frames. An extended PO may be comprised of two subframes (e.g., instead of one subframe) and/or a WTRU may check one or more (e.g., each) of the two subframes for a P-RNTI in a PO PDCCH. There may be twice as many opportunities for a successful page as in the one subframe PO. If the channel becomes free after the first subframe in the PO and before the second subframe in the PO, the page may be successful in the second subframe of the PO. The page latency may be improved by one or more DRX cycle periods.

The PO size and/or monitoring paging cycle frequency may be adapted to environment conditions (e.g., channel interference). The PO size and/or monitoring paging cycle period may be extended, contracted, and/or may remain the same, for example, to adapt to environmental conditions.

The PO may be adapted by modifying the number of subframes to look for a P-RNTI message. The PO may be adapted by modifying the paging cycle period and/or the DRX cycle period, and/or by reducing the time to the next paging occasion.

A strategy to adapt the PO may be provided.

Parameters to adapt the PO, such as the number of subframes in a PO and/or the DRX period, may be known a-priori. An eNB and/or a WTRU may use an a-priori strategy, for example, for adjusting the PO. The eNB may configure the WTRU with the strategy by control signaling (e.g., RRC configuration). For example, after a successful RACH, adaptive PO strategy information in the form of parameters, etc., may be uploaded to the WTRU. The adaptive PO strategy and/or parameters may be fixed and/or predefined, for example, prior to RACH.

The adaptive PO strategy may increase the PO size and/or the PO cycle frequency, for example, when there is interference. The PO strategy may decrease the PO size and/or PO cycle frequency, for example, when there is less or no interference. The degree to which the PO size and/or cycle frequency is increased or decreased may be based on the duration of the interference or lack of interference.

The time to a PO (e.g., the next PO) may be adapted.

The time to the next PO may be decreased (e.g., temporarily decreased) by an eNB and/or by a (e.g. any) WTRU configured to monitor for a paging message during the PO. The eNB and one/or more WTRUs may decrease the time to the next PO, for example, if the channel is busy during the PO. The eNB may be unable to gain access to the channel, for example, to transmit the page. In an example, the time to the next PO may be decreased to a fraction (e.g., ½, or ¼) of the default time to the next PO (e.g., the DRX cycle or the paging cycle), or to a fraction of the current time to the next temporary PO.

A WTRU may wake up, for example, to monitor for a page during the WTRU's configured PO. When the WTRU determines that there was no eNB transmission during the PO (e.g., due to the channel being sensed busy by the eNB), the WTRU may reduce (e.g., temporarily reduce) the time to the WTRU's next PO (e.g., next temporary PO), e.g. when the WTRU determines that there is no eNB transmission during one or more POs (e.g., consecutive POs). The number of consecutive default POs (e.g., after which the WTRU may reduce the time to the WTRU's next temporary PO) may be configured (e.g., statically or semi-statically configured). The WTRU may go to sleep after the WTRU adjusts the WTRU's time to the next temporary PO. The WTRU may wake up, for example, to monitor for a page at the next temporary PO. The WTRU may reduce the time to the WTRU's next temporary PO, for example, when the WTRU determines that there was no eNB transmission during one or more POs (e.g., one or more consecutive POs). The one or more POs may include one or more temporary and/or default POs. The WTRU may reduce the time to the next temporary PO, for example, until the time to the next PO reaches a minimum threshold (e.g., one or more sub-frames). The minimum time to the next PO may be pre-configured, for example, via RRC signaling (e.g., the minimum time to the next PO may be included in the PCCH configuration RRC message).

The WTRU may revert to the WTRU's default PO in one or more of the following instances. For example, the WTRU may revert to the WTRU's default when the WTRU determines that there is an eNB transmission during the current temporary PO, when the WTRU detects a reference signal (CRS, DRS, DM-RS), and/or when the WTRU detects a control channel masked with a P-RNTI. The strategy for the WTRU to adapt the WTRU's time to the next PO may be pre-configured by the eNB and/or the MME, for example, to ensure that the WTRU and the eNBs apply the same adaptation strategy (e.g., so that the paging opportunities, as maintained by the eNB and WTRUs, may be in synch).

Figure 7:
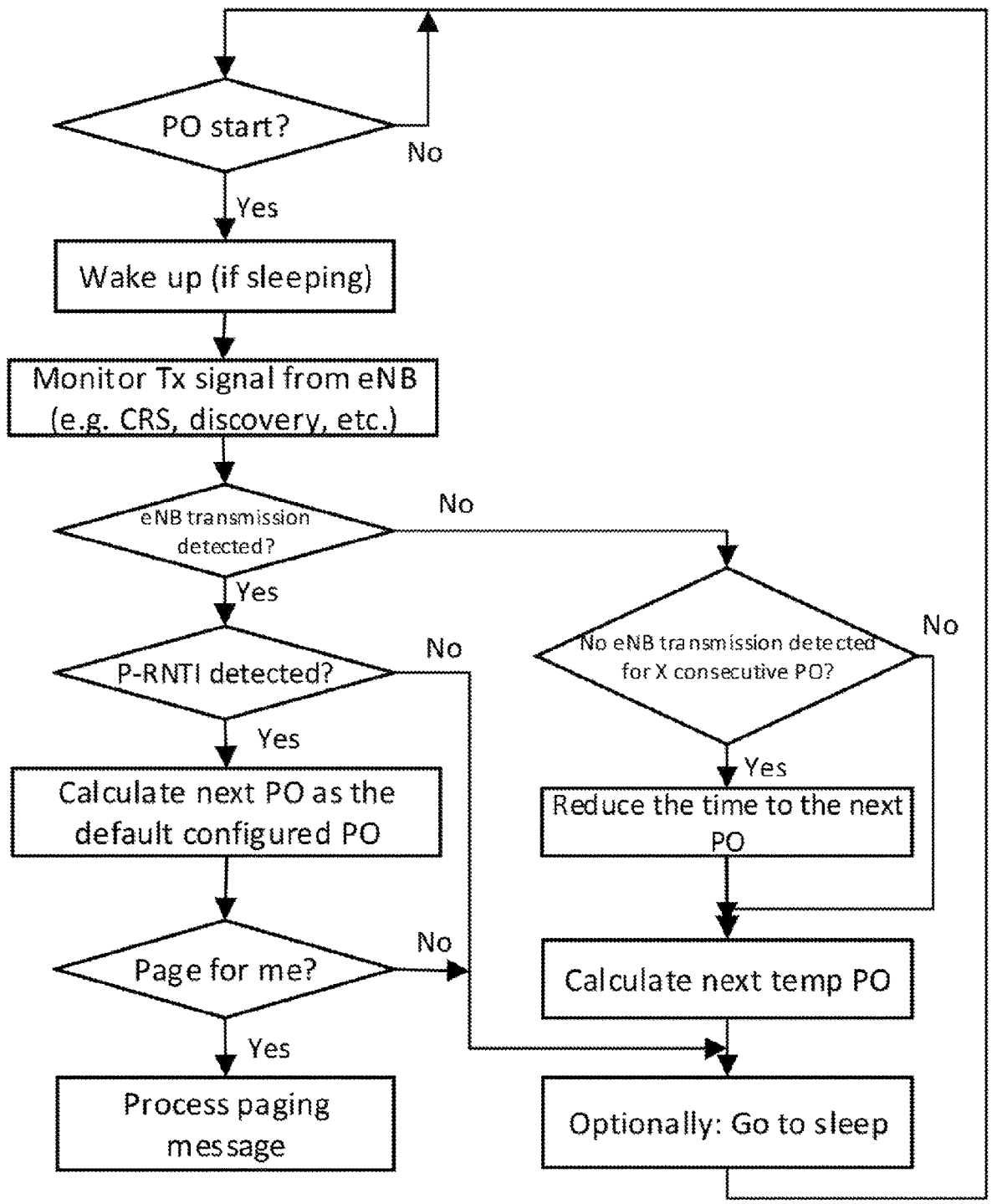
FIG. 7 is an example of a wireless transmit-receive unit (WTRU) adjusting the time to the next paging occasion (PO).

An example of a WTRU adjusting the time to the next PO is shown in FIG. 7. Adjusting the time to the next PO may be performed as described herein.

The time to the next PO may be adjusted (e.g., temporarily adjusted), for example, by adding one or more pre-configured time units (e.g. sub-frames) to a PO (e.g., the current PO). The number of time units added may be smaller than the current monitoring PC.

The time to the next PO may be adjusted (e.g., temporarily adjusted), for example, by using a temporary WTRU ID (temp_WTRU_ID), which may be set as follows: temp_WTRU_ID=k*WTRU_ID. The multiplicative factor k may be 2, 3, 4, etc. A numeric example is provided herein. In examples, if T=128 (DRX cycle), nB=T/8. There may be 16 possible paging frames per paging cycle. In examples WTRU_ID of 147, the default PO may be in SFN 24. Using k=2 in the calculation of a temporary WTRU_ID, temp_WTRU_ID=294. The temporary PO may be in SFN 48.

The time to a PO (e.g., the next PO) may be adjusted (e.g., temporarily adjusted) by using a temporary nB value for the calculation of PO (e.g., the next temporary PO, such as the next temporary PF for the WTRU and/or its corresponding PO). nB may represent the number of paging occasions in a cell specific DRX cycle. When nB takes on the values T, T/2, T/4, T/8, T/16, T/32, T/64, T/128, and T/256, or T/512 and T/1024 for NB-IoT WTRUs (where T represents the DRX cycle of the WTRU), the temporary nB may be set to temp_nB=2*nB. The next PO may be calculated by substituting temp_nB in the regular calculation of the PF and PO.

An eNB may adapt the time to the next PO.

Figure 8:
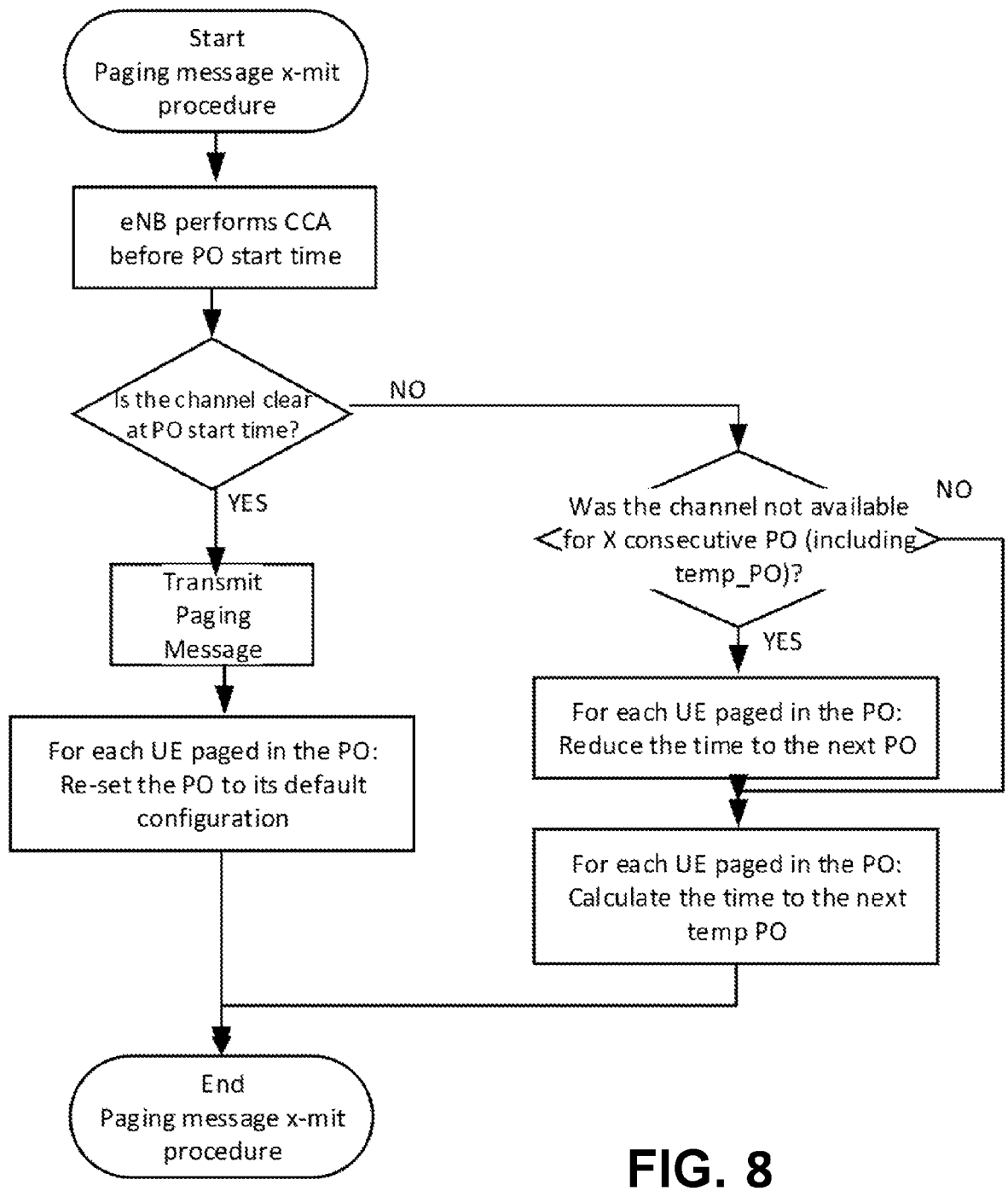
FIG. 8 illustrates an example of an eNodeB (eNB) adjusting the time to the next PO.

An example of an eNB adjusting the time to the next PO is shown in FIG. 8.

A PO may be adapted by changing the monitoring paging cycle.

A WTRU may be configured with a paging cycle (PC), which may be a WTRU-specific paging cycle or a cell-specific paging cycle. The WTRU may be configured with a monitoring paging cycle, for example, for monitoring the POs for pages. The monitoring PC may begin as the configured PC and/or may be a WTRU specific and/or a cell specific PC. An eNB and/or an WTRU may adjust (e.g. temporarily adjust) the monitoring PC, for example, to be a fraction of the configured PC and/or of the most recent monitoring PC.

The monitoring PC may be decreased (e.g. temporarily decreased) by an eNB and/or by a WTRU, for example, when a PO occurs within a busy channel precluding the eNB from transmitting a page message. The monitoring PC decrease may be a fractional multiple of the configured PC (configured DRX cycle), for example, that may be limited by a minimum paging cycle period. The monitoring PC period may be increased, for example, when a PO occurs within a free channel. The monitoring PC increase may be a multiple (e.g. integer or fraction) of the current monitoring paging cycle period, for example, that may be limited by a maximum paging cycle period.

The monitoring PC period step sequence may follow a pattern, for example, a binary power (e.g., {1, ½, ¼, ⅛} cycle period), a multiple of N (e.g., N=5; {1, ⅕, 1/10} cycle period), and/or an arbitrary pattern (e.g., {1, ½, ⅛} cycle period). The monitoring PC step may occur after one or more POs. The monitoring PC step may occur after a sequence (e.g., an arbitrary sequence) of POs occurring within a busy channel or a free channel. The monitoring PC step may be delayed from the PO occurring within a busy channel or free channel.

Figure 9:
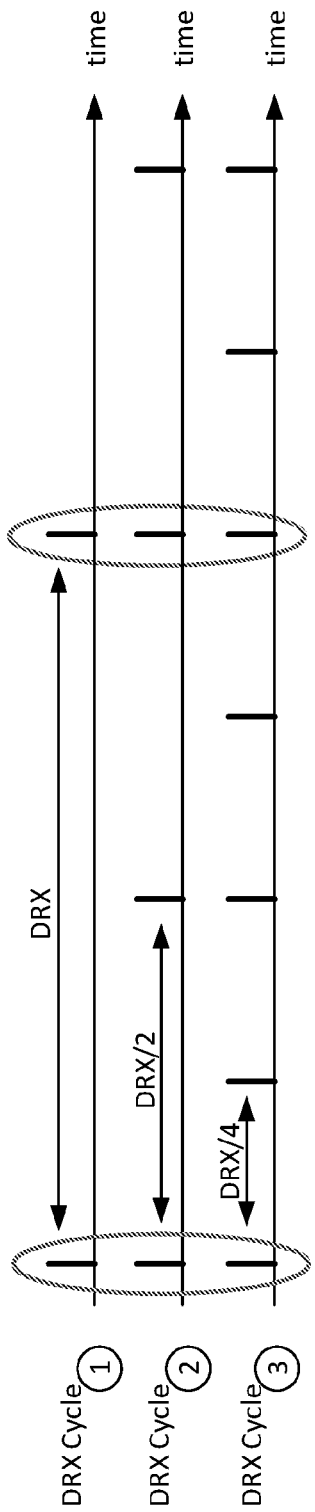
FIG. 9 is an example of an adaptive paging cycle (PC) period strategy.

The monitoring PC period step sequence may provide an overlap of POs from one or more (e.g., different) steps of the adaptive PO strategy. Providing overlap of POs from one or more (e.g., different) steps of the adaptive PO strategy may increase paging occasions, for example, if an eNB and a WTRU become out of sync in the adaptive PO strategy. In an example (e.g., including interference in the channel), an eNB may determine that the interference level is below a threshold and/or may determine that the channel is clear. The eNB may transmit the page and/or may keep the eNB's monitoring PC period unchanged. The WTRU may determine that the level of interference is above a threshold and/or the WTRU may determine that the channel is busy. The WTRU may reduce (e.g., may then reduce) the monitoring PC for the next monitoring PC and/or the WTRU may operate at a different paging cycle period from the eNB paging cycle period. FIG. 9 shows an example of an adaptive monitoring PC period step sequence. In an example, there may be three steps ({1, ½, ¼} cycle periods with respect to the initial/default configured DRX cycle) with DRX cycle '1' (top drawing) showing the normal DRX cycle to be used for no or low interference channel conditions and/or DRX cycles (monitoring paging cycles) '2' & '3' to be used for interference channel conditions. The encircled DRX cycles may show the overlapped POs. The overlapped POs may provide that (e.g., ensure) a common paging occasion may exist, for example, if the eNB and WTRU may not be using the same DRX cycle period.

Figure 10:
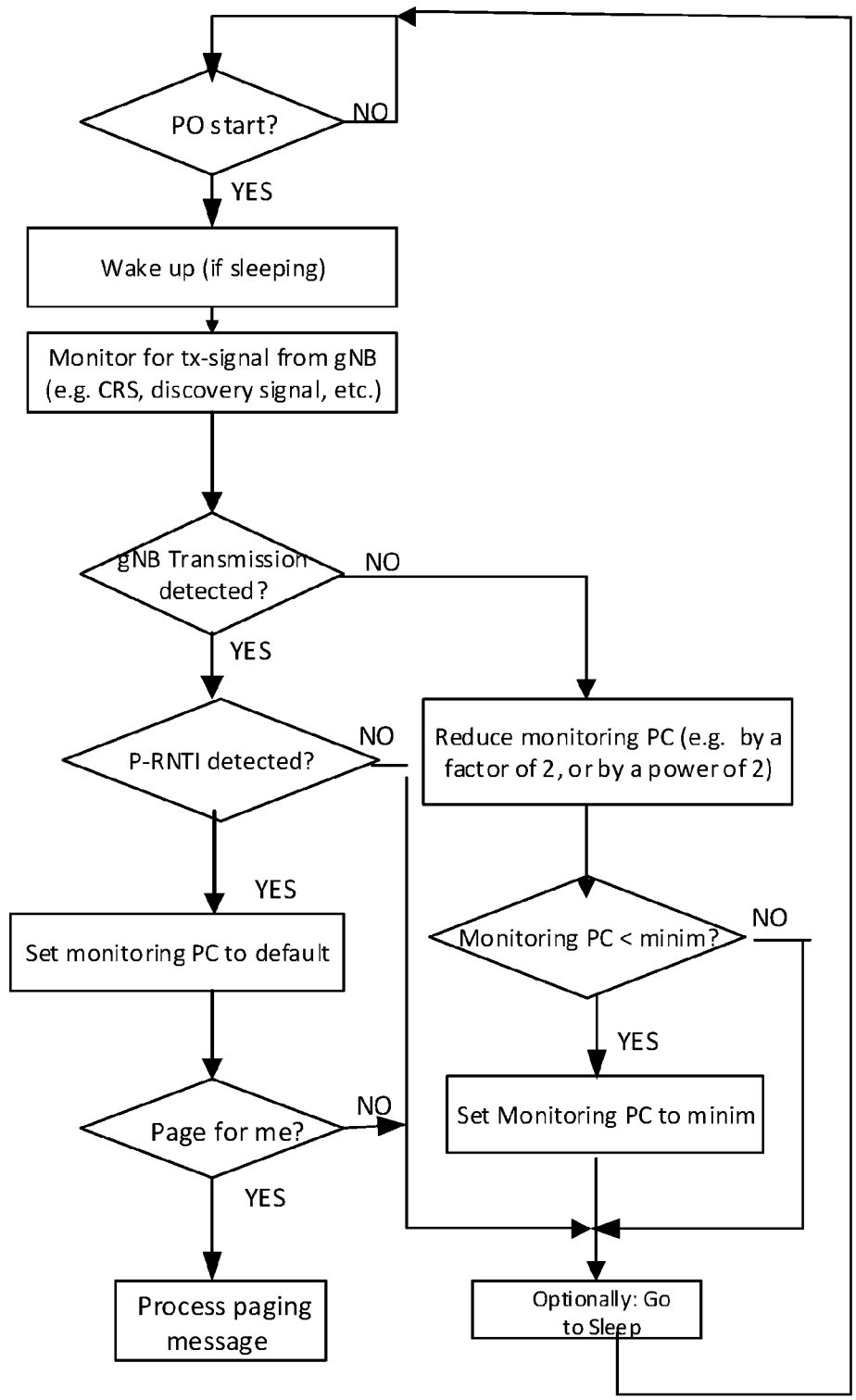
FIG. 10 is an example of a WTRU monitoring PC period adaptation.

FIG. 10 is an example WTRU monitoring paging cycle period adaptation.

The WTRU may sleep, for example, until a PO occurs. During the PO, the WTRU may monitor for a transmit signal from the gNB (e.g., may monitor for CRS, discovery signal, and/or reference signals), e.g., to determine if an gNB transmission occurred.

If the WTRU determines that there was no gNB transmission during the PO, the WTRU may determine that the channel is busy and/or the WTRU may reduce the monitoring PC (and/or the DRX cycle period), e.g., to increase the probability of success and/or to reduce the paging latency. In an example, the WTRU may reduce the monitoring PC by a pre-defined factor (e.g., by a factor of 2 or by a power of 2). The WTRU may limit the monitoring PC (and/or the DRX cycle) to a minimum cycle period. The WTRU may go to sleep and wait for the next PO.

If the WTRU determines that a gNB transmission occurred during the PO, the WTRU may decode the control channel, for example, to determine if a paging message was sent and/or a P-RNTI is detected. If the WTRU does not detect the P-RNTI, the WTRU may go to sleep (e.g., to save power). If the WTRU detects the P-RNTI, the WTRU may increase the monitoring PC, for example, because the WTRU determines that the channel was available for a gNB transmission on a page. The WTRU may set the monitoring PC (and/or the DRX cycle) to the default setting. The WTRU may increase the monitoring paging cycle by a pre-defined factor (e.g., by a factor of 2 or by a factor of a power of 2).

Figure 11:
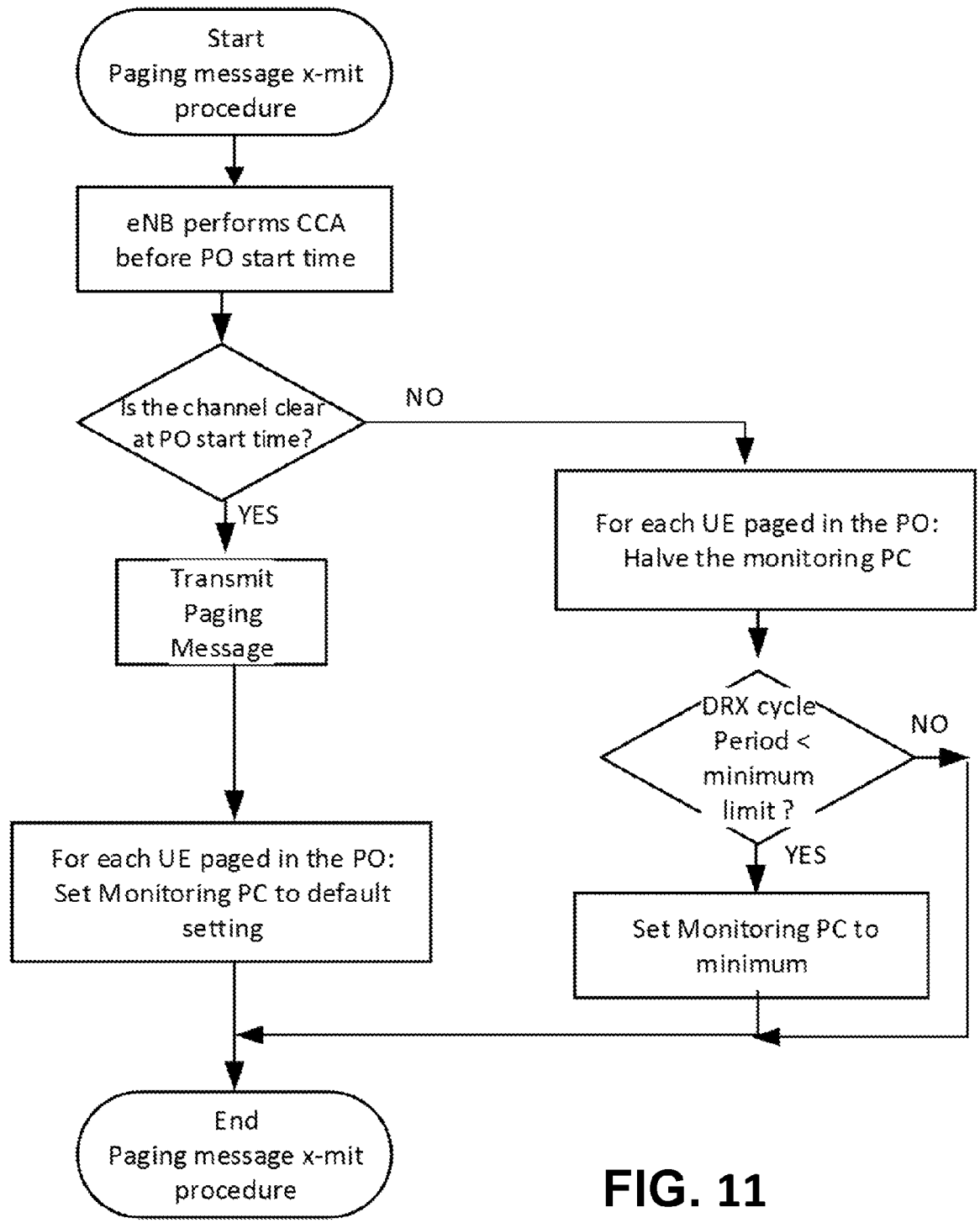
FIG. 11 is an example eNB monitoring PC adaptation.

FIG. 11 is an example eNB monitoring PC adaptation.

An eNB may perform CCA (LBT) for a PO (e.g., prior to a PO), for example, to determine if the channel is available (e.g., free). If the channel is available (e.g., free), the eNB may set the monitoring cycle period of a (e.g., each) WTRU paged in the PO to the WTRU's (e.g., each of the WTRU's) configured PC. For example, if the eNB determines that the channel is free for a PO, the eNB may set (e.g. may re-set) the monitoring cycle period, e.g., to the default (e.g., configured) paging cycle for one or more (e.g., each) WTRU paged in the PO. The eNB may send the paging message to the WTRUs that may need to be paged in the PO. If the eNB determines that the channel is not available, the eNB may decrease the monitoring PC of one or more (e.g., all) WTRUs that may need to be paged in the PO. The eNB may decrease the monitoring PC by a factor (e.g., by a factor of 2). The eNB may set the monitoring paging cycle to a minimum value, for example, when the reduction in the monitoring PC results in a period that is smaller than a minimum period (time unit).

In the example shown in FIG. 10 and FIG. 11, the monitoring PC of the WTRU and NB may be identical, for example, because they (e.g., each) have halved their monitoring PC and set the monitoring PC to the maximum limit in a similar fashion.

Figure 12:
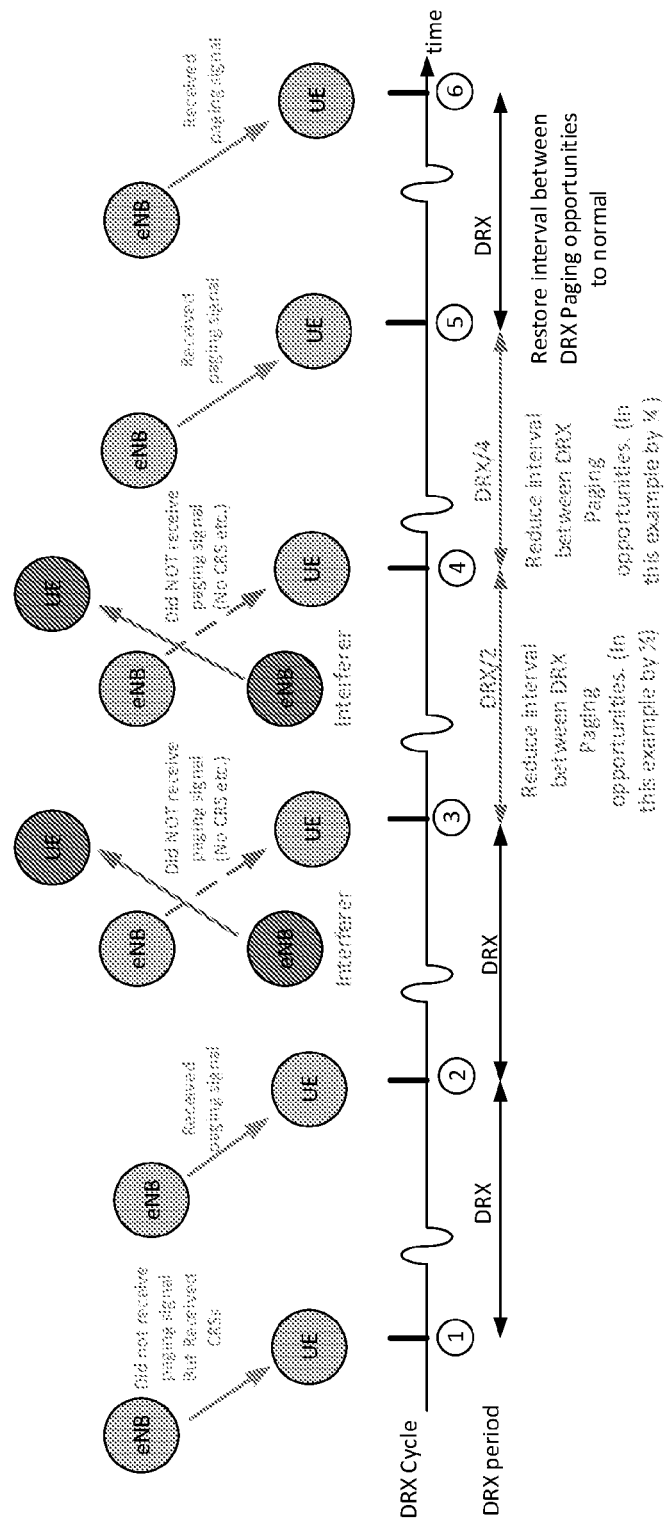
FIG. 12 is an example of adaptive PO by adjusting the paging cycle period.

FIG. 12 shows an example of an adaptive monitoring PC. In this example, during DRX cycle '1', the channel may be free of interference. The PO may be initiated at the start of a DRX cycle. The eNB may perform LBT on the channel and/or may determine that the channel is free. The eNB may not transmit a page message. The WTRU may maintain the same base paging cycle period. The WTRU may determine that the channel is free of interference, for example, by receiving CRSs transmitted by the eNB. The WTRU may determine that a paging message with the WTRU's S-TMSI has not been sent in the PO and/or the WTRU may go to sleep waiting for the next DRX cycle. The WTRU may maintain the same monitoring PC.

In DRX cycle '2', the eNB may perform LBT on the channel and/or may determine that the channel is free. The eNB may transmit a page message to the WTRUs that are being paged. The eNB may maintain the monitoring PC as the configured PC for one or more (e.g., all) WTRUs paged in the PO. The WTRU may decode the paging message in the PO and/or may determine that the WTRU has received a page (e.g., the terminal identity in the paging message matches the WTRU). The WTRU may maintain the current monitoring PC as equal to the configured PC.

In DRX cycle '3', the eNB may perform LBT on the channel and/or may determine that the channel is not free. The eNB may not transmit a paging signal. The eNB may decrease (e.g., may temporarily decrease) the monitoring paging cycle period by a factor of two with respect to the default paging cycle (e.g., for the next DRX cycle) for the WTRUs that may need to be paged during the PO. The WTRU may determine that there is interference on the channel, for example, because the WTRU did not receive reference signals from the eNB. The WTRU may decrease the monitoring paging cycle by a factor of two with respect to the default/configured paging cycle (e.g., for the next DRX cycle) and/or may go to sleep.

In DRX cycle '4', the eNB may perform LBT on the channel and/or may determine that the channel is not free. The eNB may not transmit a page message. The eNB may decrease the monitoring paging cycle by a factor of four with respect to the configured paging cycle (e.g., for the next DRX cycle). The WTRU may determine that there is interference on the channel, for example, because the WTRU did not receive reference signals from the eNB. The WTRU may decrease the WTRU's monitoring paging cycle by a factor of four with respect to the WTRU's configured paging cycle (e.g., for the next DRX cycle) and/or may go to sleep.

In DRX cycle '5', the eNB may perform LBT on the channel and/or may determine that the channel is free. The eNB may transmit a page message. The eNB may restore the default/configured paging cycle period for the next DRX cycle. The WTRU may determine that the channel is free, the WTRU may receive a paging message with the WTRU's ID, and/or the page may successfully complete. The WTRU may restore the monitoring paging cycle to the configured paging cycle for the next DRX cycle.

PO may be adapted, for example, by changing the PO window size.

The PO size may be increased by an eNB and a WTRU, for example, when a PO occurs within a busy channel precluding the eNB from transmitting a page message. The PO size increase may be one or more time units (e.g., subframes) limited by a number (e.g., a maximum number) of subframes in the PO. The PO size may be decreased, for example, when a PO occurs within a free channel. The PO size decrease may be one or more subframes, for example, limited by a minimum number of subframes in a PO.

The PO size step sequence may follow a pattern, for example, a binary power (e.g., {1, 2, 4, 8} subframes), a multiple of N (e.g., N=2; {1, 2, 4, 6, 8, 10} subframes), and/or an arbitrary pattern (e.g., {1, 2, 4, 6, 10} subframes). The PO size step may occur after one or more POs. The PO size step may occur after a sequence (e.g., an arbitrary sequence) of POs occurring within a busy channel and/or a free channel. The PO size step may be delayed from the PO occurring within a busy channel and/or a free channel.

Figure 13:
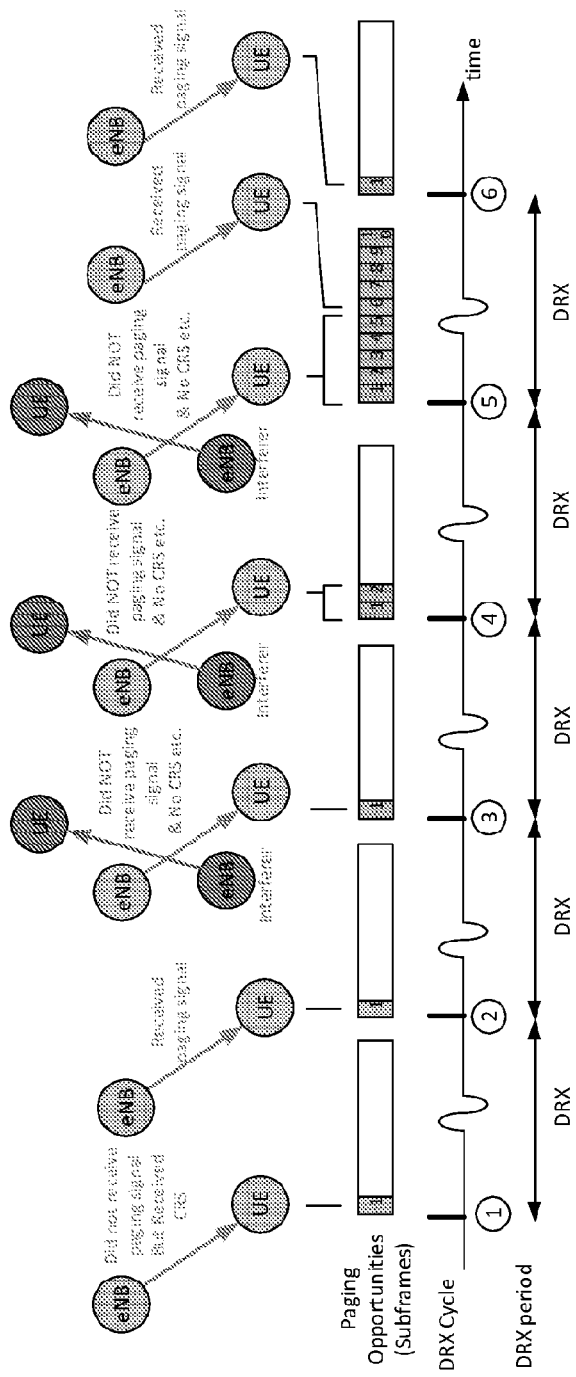
FIG. 13 is an example of adaptive PO by adjusting the PO size.

FIG. 13 shows an example of an adaptive PO by adjusting the PO size. A channel may be free of interference, as provided in DRX cycle '1'. The PO may be initiated at the start of a DRX cycle. The eNB may perform LBT on the channel and/or may determine that the channel is free. The eNB may not transmit a paging signal. The eNB may maintain the same base PO size. The WTRU may determine the channel is free of interference, for example, by receiving CRSs transmitted by the eNB. The WTRU may determine that the WTRU did not receive a paging message with the WTRU's identifier (e.g., S-TMSI) in the subframe of the PO. The WTRU may go to sleep, for example, waiting for the next DRX cycle. The WTRU may maintain the same base PO size.

In DRX cycle '2', the eNB may perform LBT on the channel and/or may determine that the channel is free. The eNB may transmit a page message to the WTRUs that may be paged (e.g., may need to be paged) in the PO and/or the eNB may maintain the same base PO size. The WTRU may determine that a paging signal has been sent in the PO subframe and/or may maintain the same base PO size.

In DRX cycle '3', the eNB may perform LBT on the channel and/or may determine that the channel is not free. The eNB may not transmit a page message. The eNB may increase the PO size for the next DRX cycle to two subframes. The WTRU may determine that there is interference on the channel, for example, because the WTRU did not receive reference signals from the eNB. The WTRU may increase the PO size, for example, to two subframes for the next DRX cycle and/or may go to sleep.

In DRX cycle '4', the eNB may perform LBT on the channel and/or may determine that the channel is not free for the two subframes within the PO. The eNB may not transmit a page message. The eNB may increase the PO size for next DRX cycle to three subframes. The WTRU may determine that there may be interference on the channel for the two subframes in the PO, for example, because the WTRU may not receive reference signals from the eNB. The WTRU may increase the PO size to three subframes for the next DRX cycle and/or may go to sleep.

If the channel is busy for seven or more DRX cycles (e.g., another seven or more DRX cycles), the PO size may be increased for a (e.g., each) DRX cycle, for example, until a maximum allowable size (e.g., ten) subframes.

In DRX cycle '5', the eNB may perform LBT on the channel and/or may determine that the channel is not free for the first five subframes. The eNB may not transmit a page message on the subframes. On the sixth subframe, the eNB may perform LBT and/or may determine that the channel is free. Upon determining that the channel is available, the eNB may transmit the paging message to the WTRUs that may be paged (e.g., may need to be paged) and whose PO may be within the first sub-frames of the current PF. The eNB may set the PO size to the minimum of one subframe. The WTRU may determine that there is interference on the channel, for example, because the WTRU did not receive reference signals for subframes one through five. On the sixth subframe, the WTRU may determine that the channel is free and/or a paging signal has been sent in the sixth subframe of the PF. The WTRU may set the PO size to the minimum one subframe.

Systems, methods and instrumentalities have been disclosed for Random Access Channel (RACH) procedures in unlicensed spectrum. Random Access Response (RAR) reception handling may include, for example, distinguishing RAR failures, RAR window adaptation or selection for RAR reception, RA-RNTI determination and resolution and RAR capacity enhancement. Clear Channel Assessment (CCA) may be implemented with window dither and/or retry delay. Physical RACH (PRACH) resources tiers with different resource opportunities may support channel acquisition/transmission.

Features, elements and actions (e.g. processes and instrumentalities) are described by way of non-limiting examples. While examples may be directed to LTE, LTE-A, New Radio (NR) or 5G protocols, subject matter herein is applicable to other wireless communications, systems, services and protocols. Each feature, element, action or other aspect of the described subject matter, whether presented in figures or description, may be implemented alone or in any combination, including with other subject matter, whether known or unknown, in any order, regardless of examples presented herein.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit, WTRU, comprising:
   circuitry comprising a processor and a transmitter/receiver unit, configured to:
   send a first transmission comprising information indicating a first preamble;
   determine that a random access response (RAR) to the first transmission has not been detected during a first RAR window having a first duration;
   determine a second RAR window having a second duration, wherein the second duration is based on a tx-signal having been detected during the first RAR window less than a threshold number of times, wherein the second duration is longer than the first duration;
   send a second transmission comprising information indicating a second preamble; and
   detect a second RAR to the second transmission during the second RAR window having the second duration.

2. The WTRU of claim 1, wherein the threshold number of times is a configured amount of times.

3. The WTRU of claim 2, wherein the configured amount of times indicates a fixed number.

4. The WTRU of claim 2, wherein the processor is configured to increment a counter for each time when the WTRU detects the tx-signal, and the determination of whether the tx-signal having been detected during the first RAR window less than a threshold number of times comprises a determination of whether the counter reaches the configured amount of times.

5. The WTRU of claim 1, wherein the circuitry is further configured to comprise a determination of whether the first duration is at a maximum duration.

6. The WTRU of claim 1, wherein the detection of the second RAR to the second transmission during the second RAR window having the second duration occurs during a portion of the second RAR window after a time duration equal to the first duration from a start of the second RAR window.

7. The WTRU of claim 1, wherein the tx-signal is any of: (1) a downlink reference signal or (2) an RAR not to the first transmission.

8. A method comprising:
sending a first transmission comprising information indicating a first preamble;
determining that a random access response (RAR) to the first transmission has not been detected during a first RAR window having a first duration;
determining a second RAR window having a second duration, wherein the second duration is based on a tx-signal having been detected during the first RAR window less than a threshold number of times, wherein the second duration is longer than the first duration;
sending a second transmission comprising information indicating a second preamble; and
detecting a second RAR to the second transmission during the second RAR window having the second duration.

9. The method of claim 8, wherein the threshold number of times is a configured amount of times.

10. The method of claim 9, further comprising incrementing a counter for each time when the tx-signal is detected, and wherein determining whether the tx-signal having been detected during the first RAR window less than a threshold number of times comprises determining whether the counter reaches the configured amount of times.

11. The method of claim 9, wherein the configured amount indicates a fixed number.

12. The method of claim 8, further comprising determining whether the first duration is at a maximum duration.

13. The method of claim 8, wherein the detecting of the second RAR to the second transmission during the second RAR window having the second duration occurring during a portion of the second RAR window after a time duration equal to the first duration from a start of the second RAR window.

14. The method of claim 8, wherein the tx-signal is any of: (1) a downlink reference signal or (2) an RAR not to the first transmission.

* * * * *